United States Patent
Kato et al.

(10) Patent No.: US 10,685,011 B2
(45) Date of Patent: Jun. 16, 2020

(54) JUDGEMENT OF DATA CONSISTENCY IN A DATABASE

(71) Applicant: International Business Machines Corporation, Armonk, NY (US)

(72) Inventors: Junichi Kato, Tokyo (JP); Takayuki Kushida, Tokyo (JP); Tomoko Murayama, Kanagawa-ken (JP); Masaharu Sakamoto, Kanagawa (JP); Kazuto Yamafuji, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 15/422,812

(22) Filed: Feb. 2, 2017

(65) Prior Publication Data

US 2018/0218026 A1    Aug. 2, 2018

(51) Int. Cl.
*G06F 16/23* (2019.01)

(52) U.S. Cl.
CPC .................. *G06F 16/2365* (2019.01)

(58) Field of Classification Search
CPC .................................................. G06F 16/2365
See application file for complete search history.

(56) References Cited

U.S. PATENT DOCUMENTS

| | | | |
|---|---|---|---|
| 5,787,443 A | 7/1998 | Palmer | |
| 7,519,952 B2 | 4/2009 | Bordawekar et al. | |
| 8,566,793 B2 | 10/2013 | Ahadian et al. | |
| 2004/0194016 A1* | 9/2004 | Liggitt | G06F 17/2247 |
| | | | 715/234 |
| 2005/0038786 A1 | 2/2005 | Yonts | |
| 2006/0294120 A1* | 12/2006 | Li | G06F 16/213 |
| 2009/0240726 A1* | 9/2009 | Carter | G06F 16/211 |
| 2012/0278290 A1 | 11/2012 | Pinch et al. | |
| 2016/0004968 A1 | 1/2016 | Hashimoto et al. | |

FOREIGN PATENT DOCUMENTS

| | | |
|---|---|---|
| JP | 2010-278754 A | 12/2010 |
| JP | 2016-014944 A | 1/2016 |

OTHER PUBLICATIONS

Gong et al., "Error detection through consistency checking", http://nature.berkeley.edu/~penggong/PDFpapers/GongMulanError.pdf, Aug. 12, 2009, 7 pages.

* cited by examiner

*Primary Examiner* — Albert M Phillips, III
(74) *Attorney, Agent, or Firm* — Robert Bunker; Edell, Shapiro & Finnan, LLC

(57) ABSTRACT

The present invention may be a method, a computer system, and a computer program product. An embodiment of the present invention provides a method for judging data consistency in a database. In one embodiment, the method comprises the following: generating a property of data obtained from a first database; associating the property with an attribute of a data model to generate a data property definition; judging whether data obtained from a second database satisfies the data property definition or not; and outputting a result of the judgment. In another embodiment, the method comprises the following: generating a property of data obtained from a database; associating the property with an attribute of a data model to generate a data property definition; judging whether data which is stored in the database satisfies the data property definition or not; and outputting a result of the judgment.

25 Claims, 18 Drawing Sheets

JUDGEMENT OF DATA CONSISTENCY IN A DATABASE

BACKGROUND

1. Technical Field

The present invention relates to data consistency in a database, and more specifically, to a technique for judging data consistency in a database.

2. Discussion of the Related Art

When companies are integrated or intra-company systems are unified, there are many opportunities to integrate pluralities of data having substantially identical sets of data obtained from different databases. It is investigated where data indicating the same content reside in each of the databases and how the data are treated. The mapping of the data is then designed. Various error detection methods may be employed to detect errors associated with these actions.

SUMMARY

According to one aspect of the present invention, an embodiment of the present invention provides a computer-implemented method for judging data consistency in a database.

In one embodiment, the method comprises the following: generating a property of data obtained from a first database; associating the property with an attribute of a data model to generate a data property definition; judging whether data obtained from a second database satisfies the data property definition or not; and outputting a result of the judgment.

In another embodiment, the method comprises the following: generating a property of data obtained from a database; associating the property with an attribute of a data model to generate a data property definition; judging whether data which is stored in the database satisfies the data property definition or not; and outputting a result of the judgment.

In a further another embodiment, the method comprises the following: generating a first property of data obtained from a first database and generating a second property of data obtained from a second database; associating the first property with an attribute of a data model to generate a first data property definition and associating the second property with an attribute of the data model to generate a second data property definition; and comparing the first data property definition with the second data property definition to judge data consistency; a data model for a third database which stores the data obtained from the first database and the data obtained from the second database being constructed or updated, using a result of the comparison.

According to another aspect of the present invention, a system, such as a computer system, comprising a processor and a memory storing a program of instructions executable by the processor to perform one or more methods described herein may be provided.

According to a further another aspect of the present invention, a computer program product comprising a computer readable storage medium storing a program of instructions executable by a system to perform one or more methods described herein also may be provided.

According to an embodiment of the present invention, the data property definition can be dynamically modified by the user and, therefore, an accuracy of finding the data mapping error can be improved.

According to an embodiment of the present invention, the data model for a third database which stores the data obtained from the first database and the data obtained from the second database can be updated and, therefore, the updated data model can be used for generating the data property definition.

According to an embodiment of the present invention, the data property definition generated using the property generated from data obtained from the third database can be used for judging data consistency in the third database and, therefore, an accuracy of finding a data mapping error can be improved.

According to an embodiment of the present invention, the data model for the third database can be updated and, therefore, the updated data model can be used for generating the data property definition.

According to an embodiment of the present invention, data consistency in the database can be automatically detected in a running environment, using the data property definition and, therefore, a data consistency can be improved.

According to an embodiment of the present invention, the data property definition can be dynamically modified by the user and, therefore, an accuracy of judging data consistency in the database can be improved.

According to an embodiment of the present invention, the first data property definition is compared with the second data property definition to judge data consistency and, therefore, the data model for the third database can be constructed or updated.

BRIEF DESCRIPTION OF THE DRAWINGS

The disclosure will provide details in the following description of preferred embodiments with reference to the following figures.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
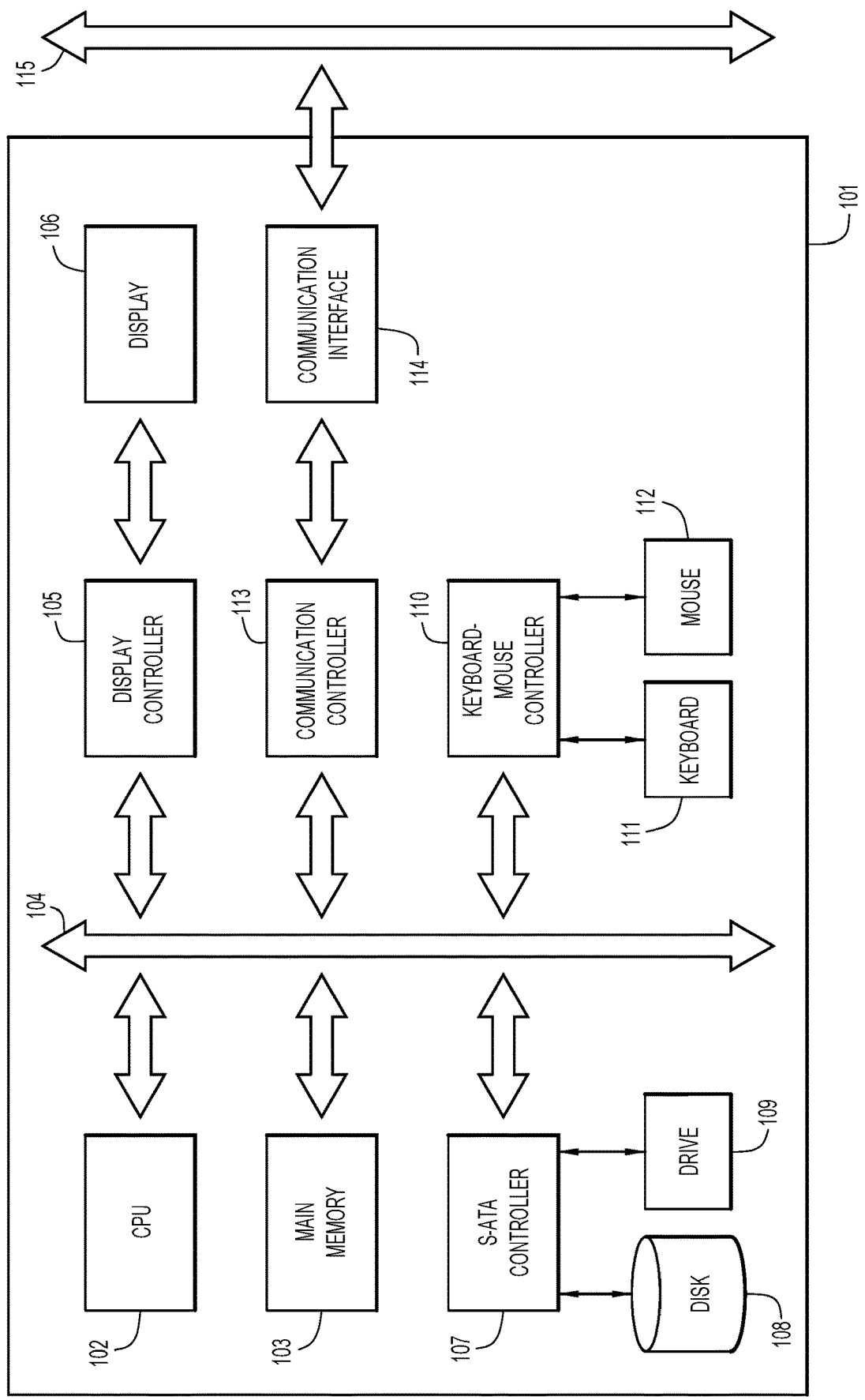
FIG. 1 illustrates an example basic block diagram of computer hardware used in an embodiment of the present invention.

With reference now to FIG. 1, FIG. 1 illustrates an example basic block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any other data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, embodiments of the present invention will be described with reference to the following FIGS. 2A to 2C, FIGS. 3A to 3E, FIGS. 4A and 4B, FIG. 5, FIGS. 6A and 6B, FIGS. 7A and 7B, and FIG. 8.

An embodiment of the present invention is based on the following perceptions.

When designing a data mapping used for database integration, it is difficult to verify data integrity other than data type confliction.

For example, an error detection for a data type is easy during mapping. However, it is difficult to automatically detect semantic errors in the data mapping.

Examples of such cases include: a case where columns having the same column name but indicate different entities. For example, each of columns having the column name, "Name," indicates patient names and doctor names, respectively; a case where columns for similar purposes but with different conditions produce inconsistencies in compilation range or time period; and a case where items with inconsistent numeric value units are mixed up.

Accordingly, it is required to detect possible semantic errors in the data mapping.

FIGS. 2A to 2F illustrate one embodiment of a flowchart of a process for judging data consistency in a database.

A system, such as the computer (101) described in FIG. 1, performs each of the steps described in each of FIGS. 2A to 2F. The system may be implemented as a single computer or a plurality of computers.

The system may receive data from a first database and data from a second database. The first database may be a first source database to be integrated with the second database. The second database may be a second source database to be integrated with the first database.

Each of the first database and the second database may be any database such as a database used for corporate or personal purposes. Each of the first database and the second database may be, for example, but not limited to, a personal name database, a disease name database, an address database, or a corporate name database.

An integrated database is used for storing data obtained from the first database and data obtained from the second database and corresponds to a third database.

An example of the first database, the second database, and the integrated database corresponding to the third database will be explained by referring to FIG. 8 described below.

Figure 8:
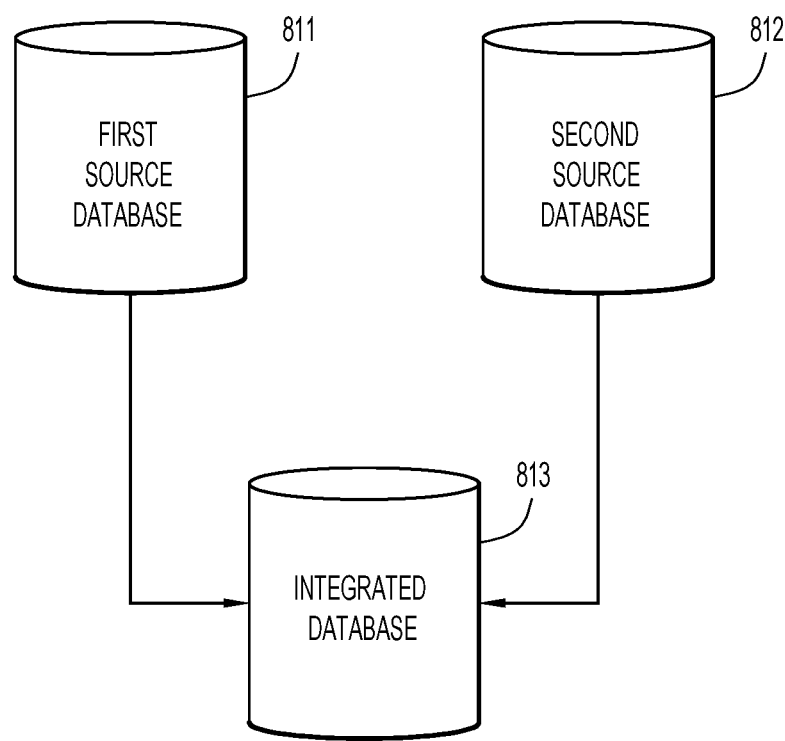
FIG. 8 illustrates integrating a first source database and a second source database into an integrated database according to an embodiment.

With reference now to FIG. 8, FIG. 8 illustrates an example diagrams of a first source database and a second source database and an integrated database according to an embodiment.

The first source database (811) provides the integrated database (813) with data. The second source database (812) also provides the integrated database (813) data. Accordingly, the integrated database stores data obtained from the first source database (811) and data obtained from the second source database (812).

Figure 2A:
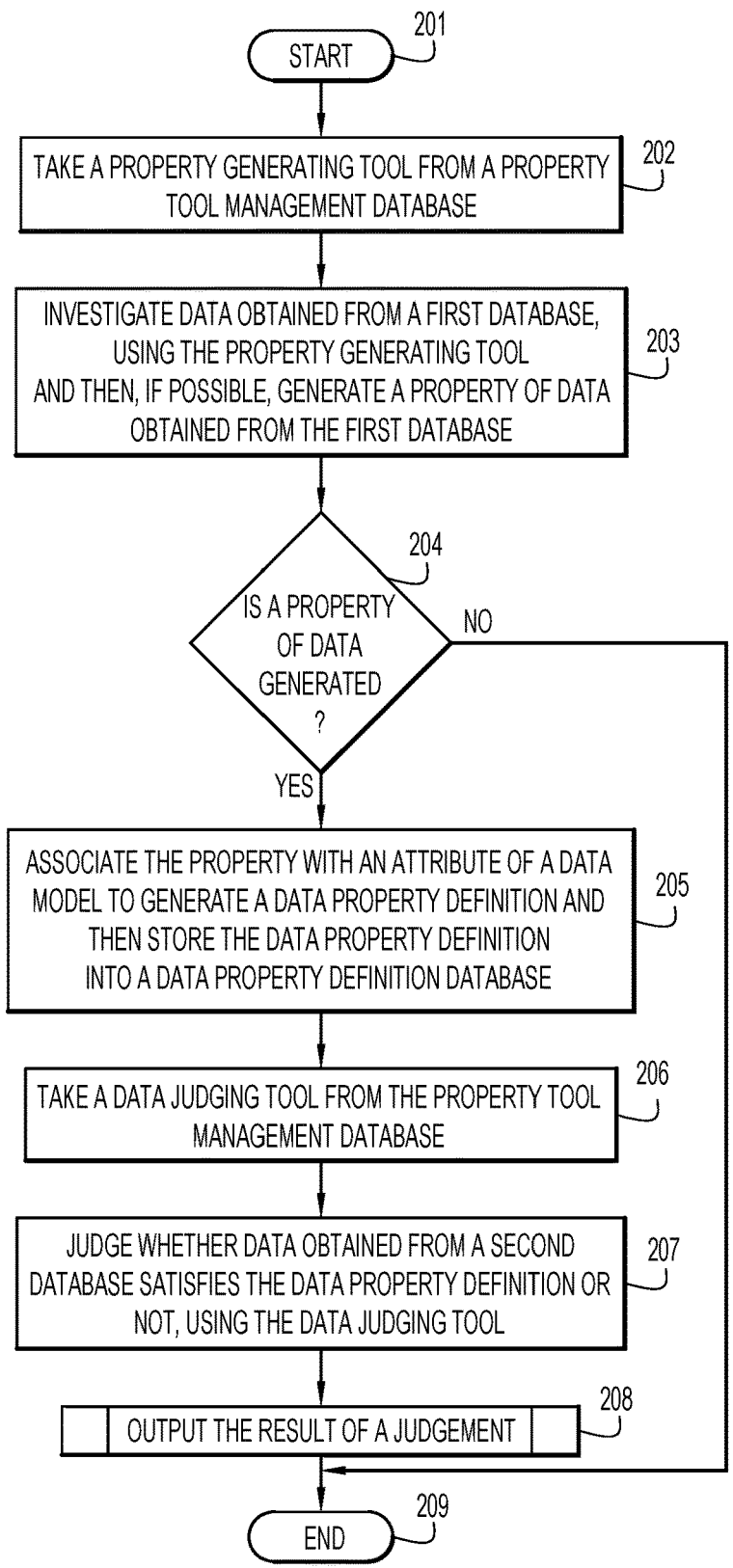
FIGS. 2A to 2F illustrate a flowchart of a process for judging data consistency in a database according to one embodiment.

With reference now to FIG. 2A, FIG. 2A illustrates one embodiment of a process for judging data consistency in a database.

In step 201, the system starts the process for judging data consistency in a database.

In step 202, the system may take a property generating tool from a property management database. An example of the property generating tool and the property management database will be explained below with reference to FIG. 5.

In step 203, the system investigates data obtained from the first database, using the property generating tool, and then, if possible, generates a property of data obtained from the first database.

The data obtained from the first database may be a part or all of data stored in the first database. The data obtained from the first database may be obtained by referring to the first database or receiving the data from the first database.

The investigation may be made objectively and by automatically analyzing data.

The property of data may be generated so as to show semantic relations between columns or rows or to show a semantic characteristic in a column or row.

In one embodiment, the property of data may be generated, based on a tendency of data obtained from the first database. The tendency of data obtained from the first database may be, for example, but not limited to, a tendency of the number of data variations in columns or rows.

In another embodiment, the property of data may be generated, based on a tendency of data in a plurality of columns or rows in the first database. The tendency of data in a plurality of columns or rows in the first database may be, for example, but not limited to, a tendency of the number of data variations in a column or row. For example, for a relation between a column A and column B where B is larger than A, there is a tendency that the number of data variations in the column B is greater than the number of data variations in the column A.

In another embodiment, the property of data may be generated, based on data in a plurality of columns or rows in the first database, and a part of the data in the plurality of columns or rows in the first database may comprise a column name or row name, respectively. The column name or row name can be used to identify a characteristic of the data.

The property of data may be for example, but not limited to, the number of data variations in each column or row, a property of numerical data in each column or row, a property of character string data in each column or row, a property of data category in each column or row, or a combination of these. In a case where the property of data is a property of character string data in each column or row, the property of character string data may be, for example, but not limited to, the length of characters of alphabets; the length of digits of numerals; or a fixed length with X alphabets, alpha numerals, symbols, or a combination of these.

In step 204, the system judges whether a property of data is generated. If the judgment is positive, the system proceeds to step 205. Meanwhile, if the judgment is negative, the system proceeds to a final step 209.

In step 205, the system associates the generated property with an attribute of a data model to generate a data property definition.

The data model may be an abstract model which organizes elements of data and standardizes how the elements relate to one another and to properties of the data in a database.

In one embodiment, the data model may be for a database which stores the data obtained from the first database. In another embodiment, the data model may be for an integrated database which stores the data obtained from the first database and the data obtained from the second database.

A mapping design in the data model is designed in advance by a tool for generating a data model or by a user.

The data property definition has the generated property and the attribute of the data model.

The system may store the data property definition into a data property definition database.

In step 206, the system may take a data judging tool from the property tool management database. An example of the data judging tool and the property tool management database will be explained below in reference to FIG. 5.

In step 207, the system judges whether data from the second database satisfies the data property definition or not, using the data judging tool. The second database is different from the first database.

The data obtained from the second database may be a part or all of data stored in the second database. The data obtained from the second database may be obtained by referring to the second database or receiving the data from the second database.

In step 208, the system outputs a result of the judgment. The details of step 208 will be explained below by referring to FIG. 2B.

In step 209, the system terminates the process mentioned above.

According to the process described in FIG. 2A, an error of a data mapping between databases can be automatically detected in a running environment, using the data property definition and, therefore, an accuracy of finding the data mapping error can be improved.

Figure 2B:
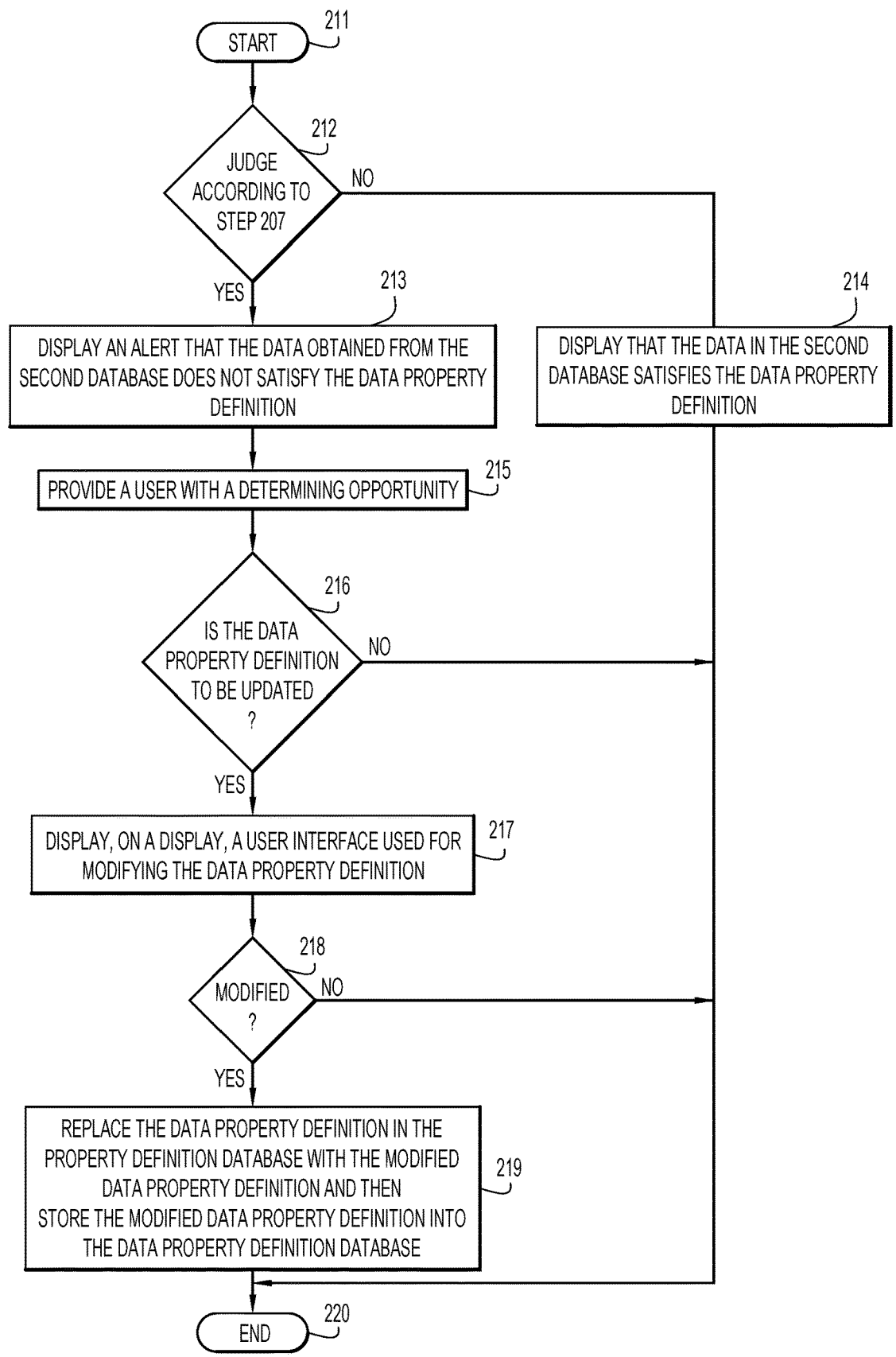

With reference now to FIG. 2B, FIG. 2B illustrates a detailed flowchart of the step 208 described in FIG. 2A according to an embodiment.

In step 211, the system starts the process of step 208.

In step 212, the system judges, as seen in step 207 described in FIG. 2A, whether data from the second database satisfies the data property definition or not, using the data judging tool. If the judgment is positive, the system proceeds to step 213. Meanwhile, if the judgment is negative, the system proceeds to step 214.

In step 213, the system may display an alert that the data obtained from the second database does not satisfy the data property definition.

In step 214, the system may display that the data obtained from the second database satisfies the data property definition. In one embodiment, the display may be an icon indicating "healthy". After displaying, the system may proceed to a final step 220.

In step 215, the system provides a user, such as a data model developer, with a determining opportunity in order to decide, for example, whether there is an error of data mapping between the data obtained from the first database and the data obtained from the second database; the data property definition is to be updated; or the data property definition is to be invalidated.

In step 216, the system may judge whether the data property definition is to be updated or not. If the judgment is positive, the system proceeds to step 217. Meanwhile, if the judgment is negative, the system proceeds to the final step 220.

In step 217, the system may display, on a display which may be connected to the system, a user interface used for modifying a data property definition. The user may modify a data property definition via the user interface.

In step 218, the system may judge whether the data property definition is modified or not. If the judgment is positive, the system proceeds to step 219. Meanwhile, if the judgment is negative, the system proceeds to the final step 220.

In step 219, the system may replace the data property definition with the modified data property definition and then store the modified data property definition into the data property definition database.

In step 220, the system terminates the process mentioned above.

According to the process described in FIG. 2B, the data property definition can be dynamically modified by the user and, therefore, an accuracy of finding the data mapping error can be improved.

Figure 2C:
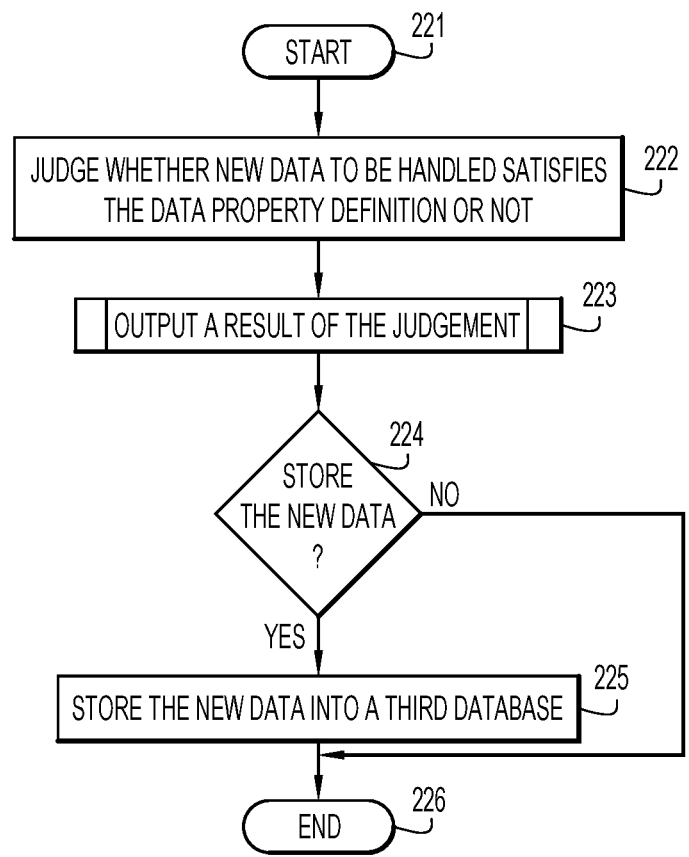

With reference now to FIG. 2C, FIG. 2C illustrates a flowchart of an optional process for judging data consistency in a database, using the modified data property definition obtained from step 219 described in FIG. 2B.

In step 221, the system starts the process for judging data consistency in a database.

In step 222, the system judges whether new data to be handled satisfies the modified data property definition or not, using the data judging tool. The new data may be new data obtained from the first database, new data obtained from the second database or new data which is a subject of storing in an integrated database (corresponding to the third database) which stores the data obtained from the first database and the data obtained from the second database.

In step 223, the system outputs a result of the judgment. The details of step 223 are the same as those described in FIG. 2B.

In step 224, the system may judge whether the new data can be stored into the third database or not. If the judgment is positive, the system proceeds to step 225. Meanwhile, if the judgment is negative, the system proceeds to the final step 226.

In step 225, the system may store the new data into the third database.

In step 226, the system terminates the process mentioned above.

According to the process described in FIG. 2C, the modified data property definition can be used for detecting a data mapping error for the third database and, therefore, an accuracy of finding a data mapping error can be improved.

Figure 2D:
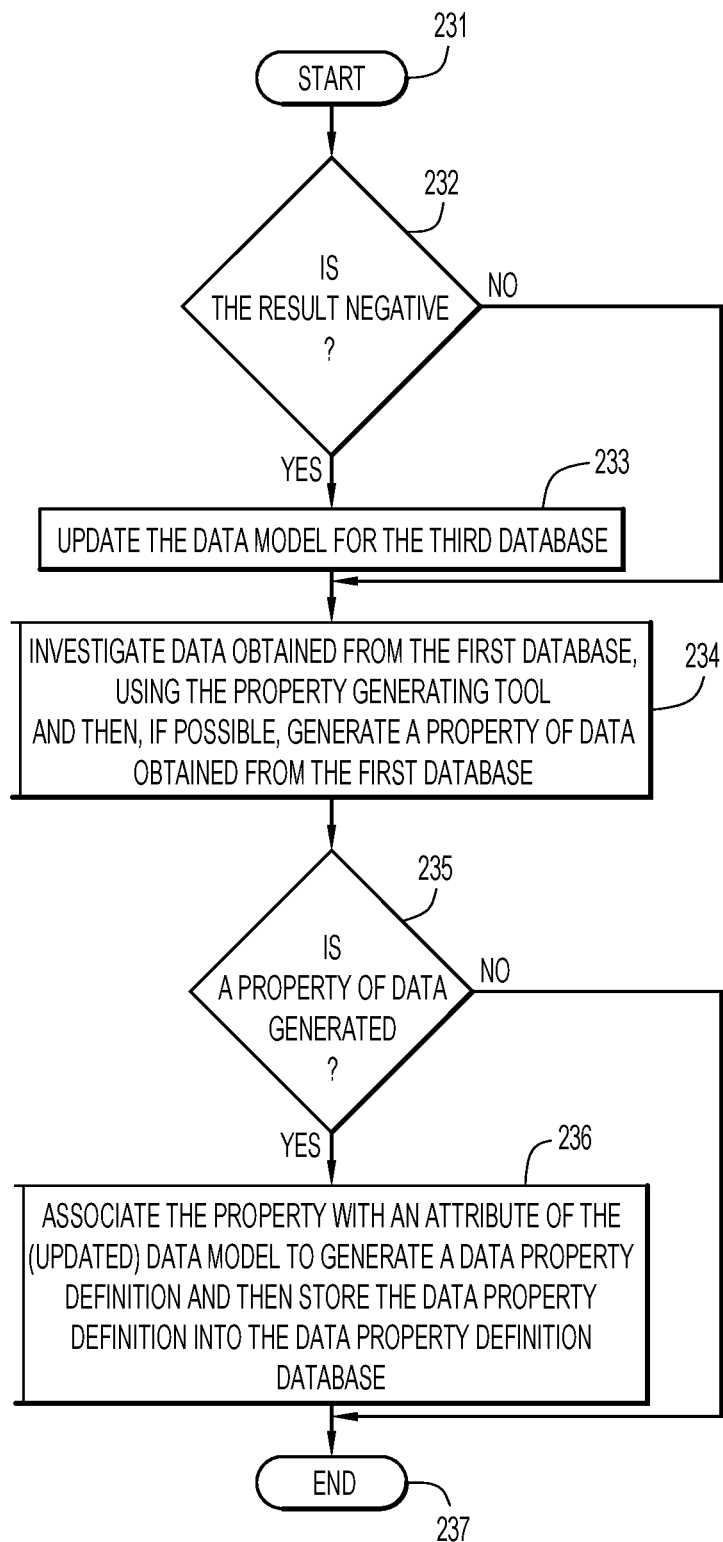

With reference now to FIG. 2D, FIG. 2D illustrates a flowchart of an optional process for updating the data model for the third database.

In step 231, the system starts the process for updating the data model for the third database.

In step 232, the system judges whether the result of the judgment is negative or not. If the judgment is positive, the system proceeds to step 233. Meanwhile, if the judgment is negative, the system proceeds to step 234.

In step 233, the system updates the data model for the third database, using the output result obtained from step 208 described in FIG. 2A or using the modified data property definition obtained from step 219 described in FIG. 2B. Alternatively, the data model is updated by a user, using the output result obtained from step 208 described in FIG. 2A or using the modified data property definition obtained from step 219 described in FIG. 2B.

In step 234, the system investigates data obtained from the first database, using the property generating tool, and then, if possible, generates a property of data obtained from the first database. The details of step 234 are the same as those mentioned in step 203 described in FIG. 2A.

In step 235, the system judges whether a property of data is generated. If the judgment is positive, the system proceeds to step 236. Meanwhile, if the judgment is negative, the system proceeds to a final step 237.

In step 236, the system associates the generated property with an attribute of the updated data model to generate a data property definition in a case where the data model for the third database was updated in step 233, and then store the data property definition into the data property definition database.

Meanwhile, the system associates the generated property with an attribute of the data model (not the updated data model) to generate a data property definition in a case where the data model for the third database was not updated, and then store the data property definition into the data property definition database.

In step 237, the system terminates the process mentioned above.

According to the process described in FIG. 2D, the data model for the third database can be updated and, therefore, the updated data model can be used for generating the data property definition.

Figure 2E:
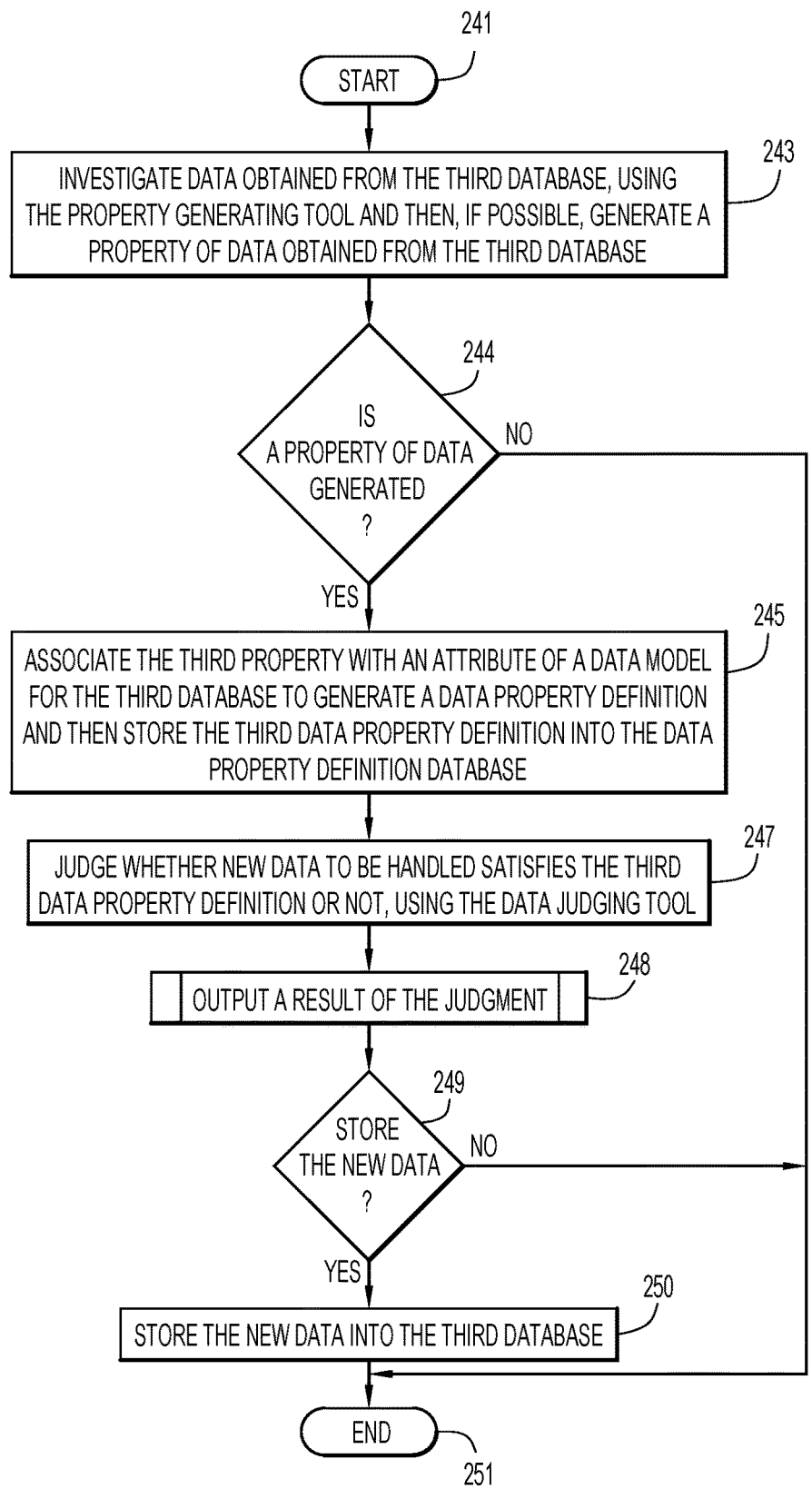

With reference now to FIG. 2E, FIG. 2E illustrates a flowchart of an optional process for judging data consistency in the third database.

In step 241, the system starts the process for judging data consistency in the third database.

In step 243, the system investigates data obtained from the third database, using the property generating tool, and then, if possible, generates a third property of data obtained from the third database. The details of step 243 correspond to those mentioned in step 203 described in FIG. 2A.

In step 244, the system judges whether a third property of data is generated. If the judgment is positive, the system proceeds to step 245. Meanwhile, if the judgment is negative, the system proceeds to a final step 251.

In step 245, the system associates the generated third property with an attribute of a data model for the third database to generate a third data property definition. The data model may be an abstract model which organizes elements of data and standardizes how the elements relate to one another and to properties of the data in a database.

The third data property definition has the generated third property and the attribute of the data model for the third database.

The system may store the third data property definition into the data property definition database.

In step 247, the system judges whether new data to be handled satisfies the data property definition or not, using the data judging tool. The second database is different from the first database.

In step 248, the system outputs a result of the judgment. The details of step 248 are the same as those described in FIG. 2B with the proviso that the term, "the second database" in each of step 213 and 214 are replaced with the term, "the third database".

In step 249, the system may judge whether the new data can be stored into the third database. If the judgment is positive, the system proceeds to step 250. Meanwhile, if the judgment is negative, the system proceeds to the final step 251.

In step 250, the system may store the new data into the third database.

In step 251, the system terminates the process mentioned above.

According to the process described in FIG. 2E, the data property definition generated using the property generated from data obtained from the third database can be used for judging data consistency in the third database and, therefore, an accuracy of finding a data mapping error can be improved.

Figure 2F:
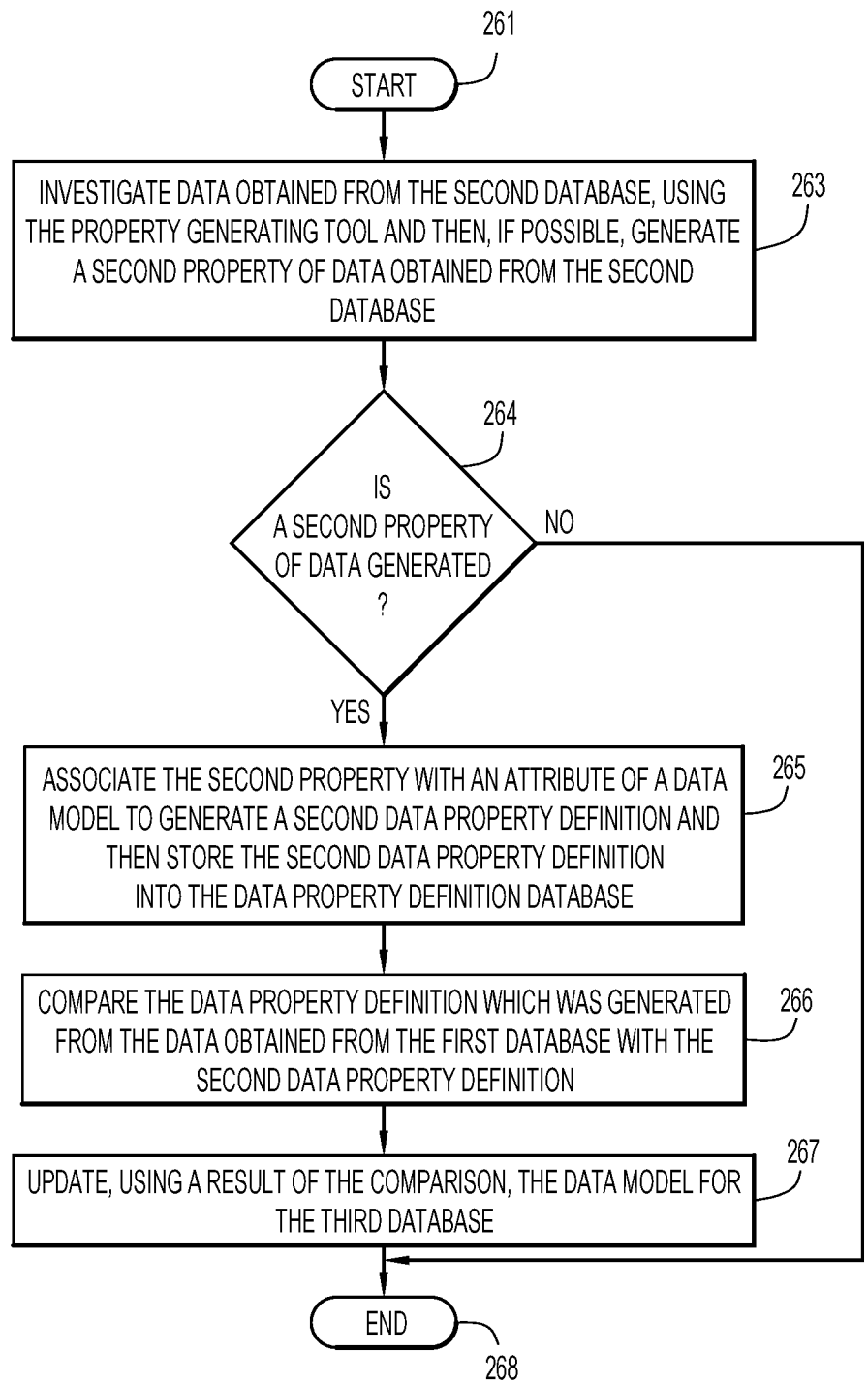

With reference now to FIG. 2F, FIG. 2F illustrates a flowchart of an optional process for updating the data model for the third database, using both of the property of data obtained from the first database and the property of data obtained from the second database.

The data obtained from the second database may be the same as mentioned in step 207 described in FIG. 2A.

In step 261, the system starts the process for updating the data model for the third database.

In step 263, the system investigates data obtained from the second database, using the property generating tool, and then, if possible, generates a second property of data obtained from the second database.

The investigation may be made as the same manner mentioned in step 203 described in FIG. 2A.

The second property of data may be generated as the same manner mentioned in step 203 described in FIG. 2A.

In step 264, the system judges whether a second property of data is generated. If the judgment is positive, the system proceeds to step 265. Meanwhile, if the judgment is negative, the system proceeds to a final step 268.

In step 265, the system associates the generated second property with an attribute of the data model to generate a second data property definition. The data model may be an abstract model which organizes elements of data and standardizes how the elements relate to one another and to properties of the data in a database.

The second data property definition has the generated property and the attribute of the data model.

In step 266, the system compares the first data property definition which was generated from the data obtained from the first database with the second data property definition.

In step 267, the system updates, using a result of the comparison, the data model for the third database.

In step 268, the system terminates the process mentioned above

According to the process described in FIG. 2F, the data model for the third database can be updated and, therefore, the updated data model can be used for generating the data property definition.

Figure 3A:
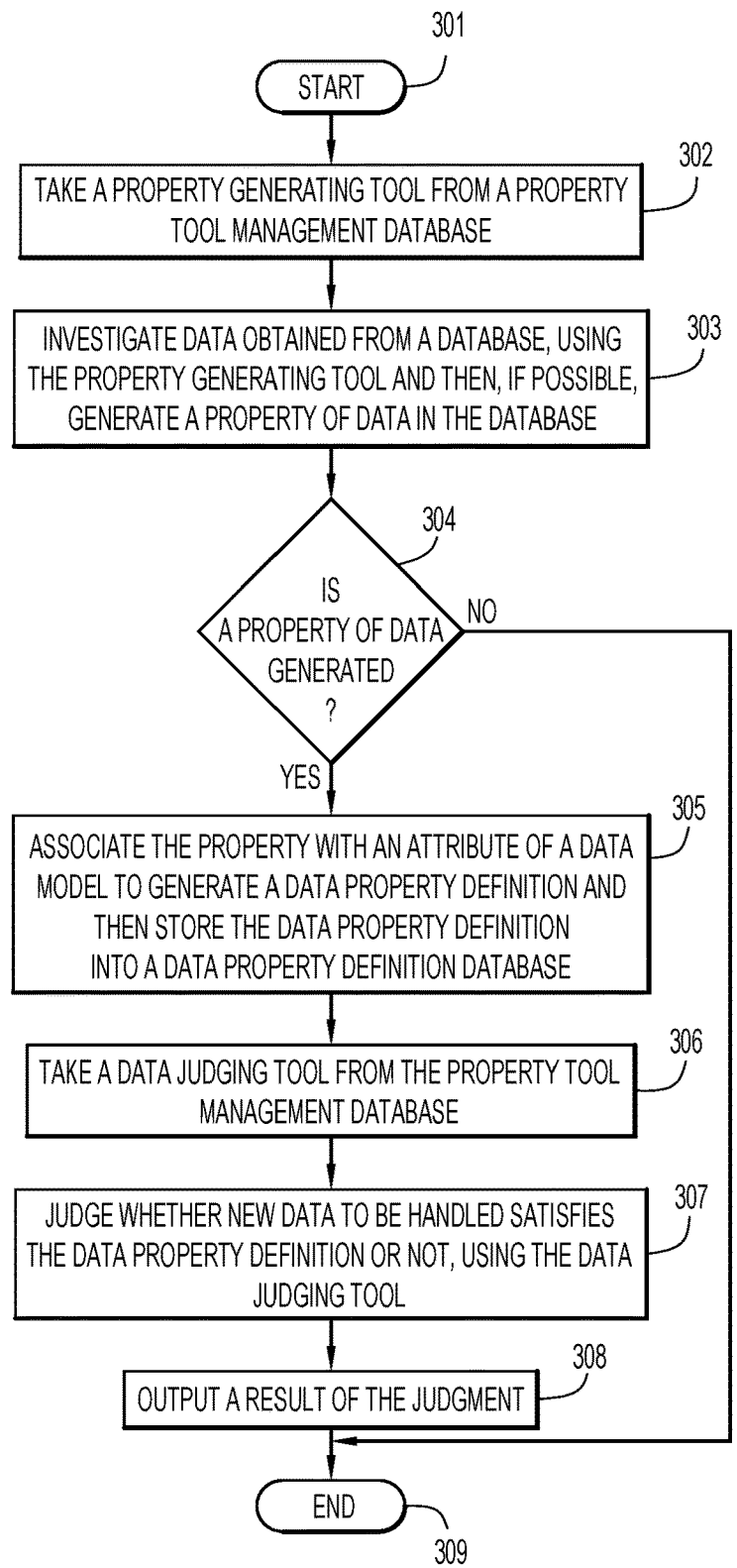
FIGS. 3A and 3B illustrate a flowchart of a process for judging data consistency in a database according to another embodiment.
Figure 3B:
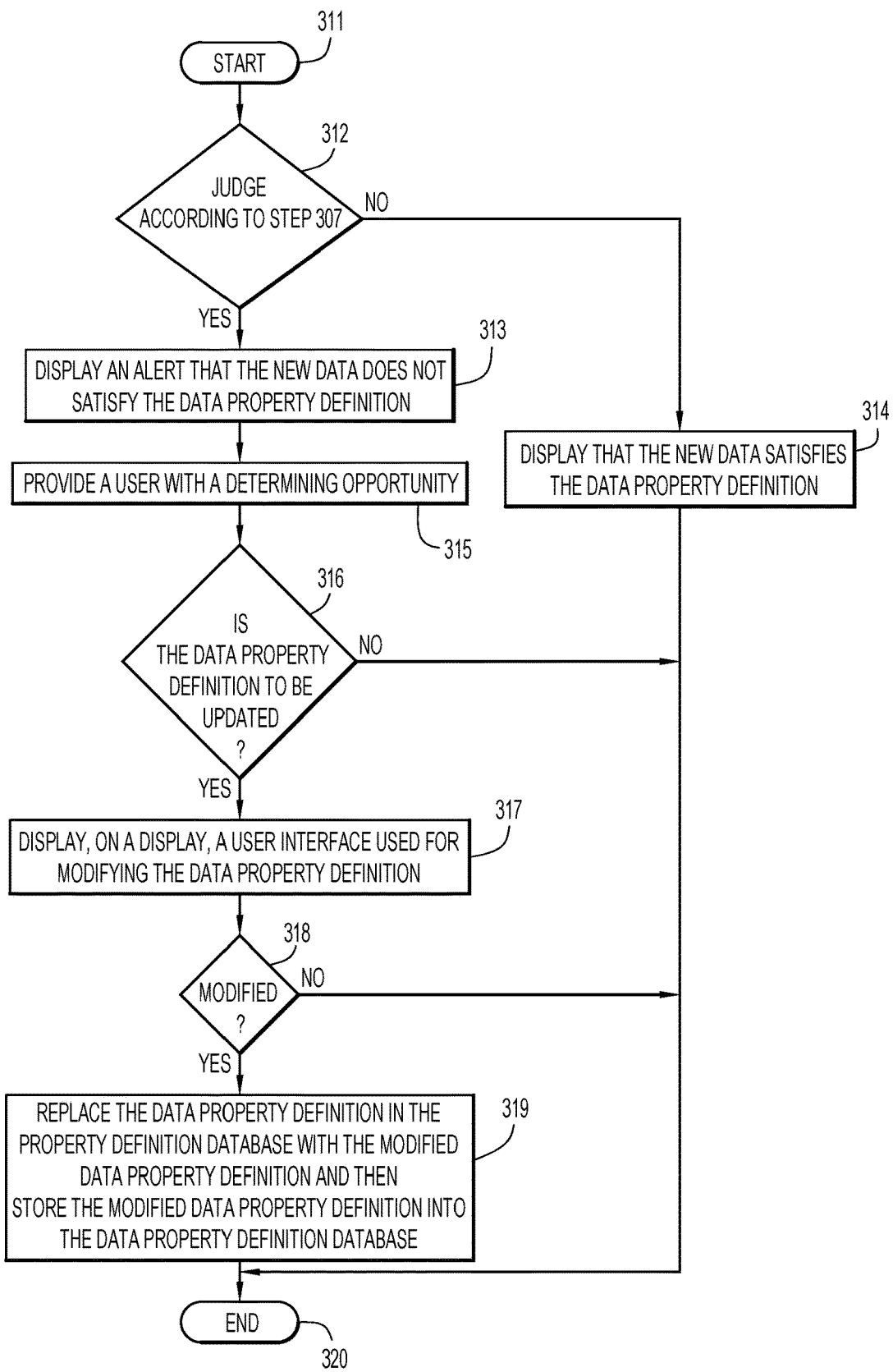

FIGS. 3A and 3B illustrate a flowchart of a process for judging data consistency in a database according to another embodiment.

A system, such as the computer (101) described in FIG. 1, performs each of the steps described in each of FIGS. 3A and 3B. The system may be implemented as a single computer or a plurality of computers.

The system may receive data from a database.

The database may be any database such as a database used in corporate or personal purpose. The database may be, for example, but not limited to, a personal name database, a disease name database, an address database, or a corporate name database.

With reference now to FIG. 3A, FIG. 3A illustrates another embodiment of a process for judging data consistency in a database.

In step 301, the system starts the process for judging data consistency in a database.

In step 302, the system may take a property generating tool from a property management database.

In step 303, the system investigates data obtained from the database, using the property generating tool, and then, if possible, generates a property of data obtained from the database.

The data obtained from the database may be a part or all of data stored in the database. The data obtained from the database may be obtained by referring to the database or receiving the data from the database.

The investigation may be made in the same manner mentioned in step 203 described in FIG. 2A.

The property of data may be generated in the same manner mentioned in step 203 described in FIG. 2A.

In step 304, the system judges whether a property of data is generated or not. If the judgment is positive, the system proceeds to step 305. Meanwhile, if the judgment is negative, the system proceeds to a final step 309.

In step 305, the system associates the generated property with an attribute of a data model to generate a data property definition.

The data model may be the same as that mentioned in step 205 described in FIG. 2A.

The data property definition has the generated third property and the attribute of the data model for the database.

The system may store the data property definition into the data property definition database.

In step 306, the system may take a data judging tool from the property tool management database.

In step 307, the system judges whether new data to be handled satisfies the data property definition or not, using the data judging tool.

The data obtained from the database may be obtained by referring to the database or receiving the data from the database.

In step 308, the system outputs a result of the judgment. The details of step 308 will be explained below by referring to FIG. 3B.

In step 309, the system terminates the process mentioned above.

According to the process described in FIG. 3A, data consistency in the database can be automatically detected in a running environment, using the data property definition and, therefore, a data consistency can be improved.

With reference now to FIG. 3B, FIG. 3B illustrates a detailed flowchart of the step 308 described in FIG. 3A according to one embodiment.

In step 311, the system starts the process of step 308.

In step 312, the system judges, as seen in step 307 described in FIG. 3A, whether data from the database satisfies the data property definition, using the data judging tool. If the judgment is positive, the system proceeds to step 313. Meanwhile, if the judgment is negative, the system proceeds to step 314.

In step 313, the system may display an alert that the data obtained from the database does not satisfy the data property definition.

In step 314, the system may display that the data obtained from the database satisfies the data property definition. In one embodiment, the display may be an icon indicating "healthy." After displaying, the system may proceed to a final step 320.

In step 315, the system provides a user, such as a data model developer, with a determining opportunity in order to decide, for example, whether there is a problem with data consistency in the database; the data property definition is to be updated; or the data property definition is to be invalidated.

Steps 316 to 319 correspond to step 216 to 219 described in FIG. 2A, respectively. Accordingly, the overlapping explanations of steps 316 to 319 will be omitted here.

In step 320, the system terminates the process mentioned above.

According to the process described in FIG. 3B, the data property definition can be dynamically modified by the user and, therefore, an accuracy of judging data consistency in the database can be improved.

Figure 4:
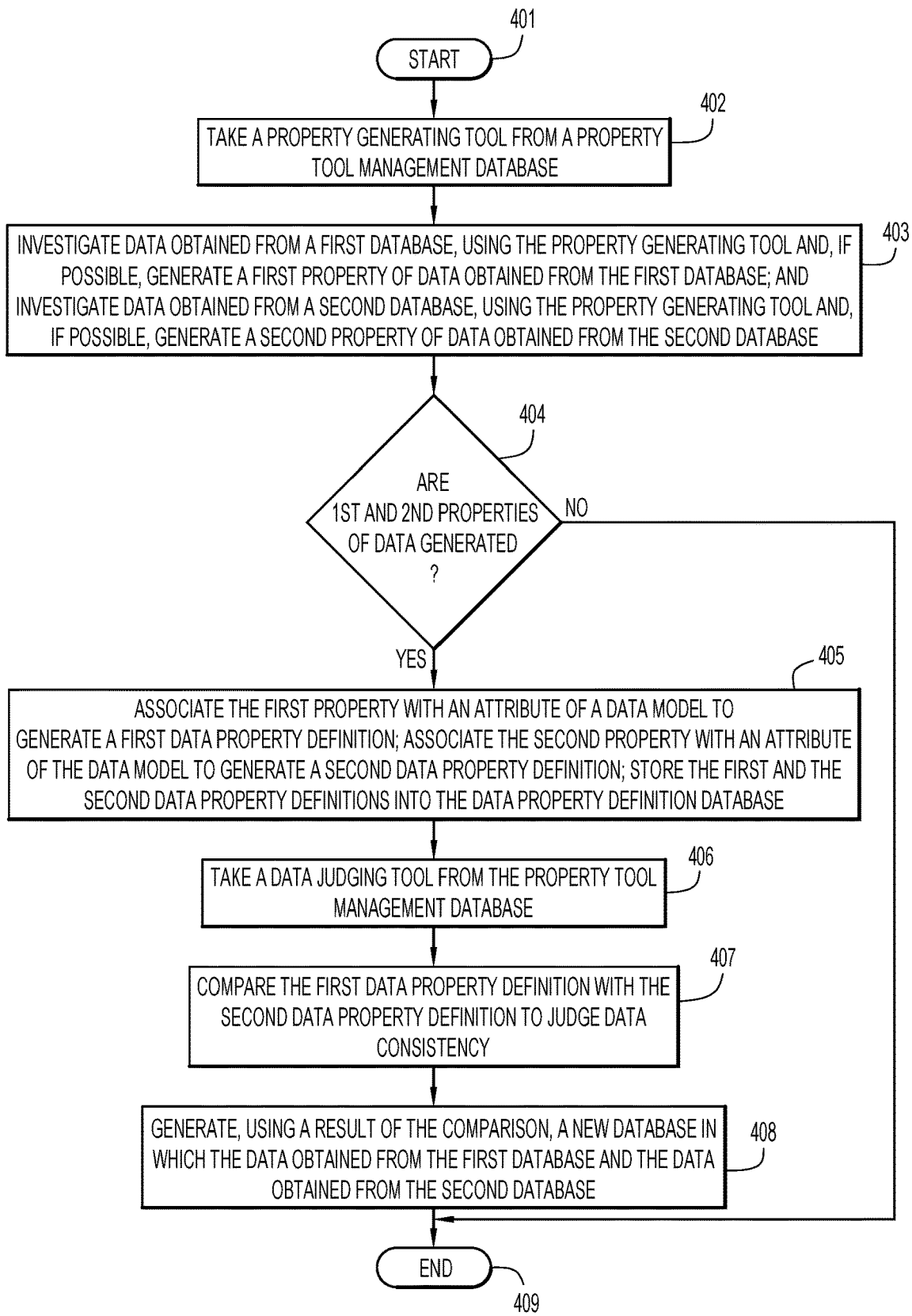
FIG. 4 illustrates a flowchart of a process for judging data consistency in a database and then constructing or updating a data model for an integrated database according to a further embodiment.

With reference now to FIG. 4, FIG. 4 illustrates a flowchart of a process for judging data consistency in a database and then constructing or updating a data model for an integrated database according to another embodiment.

A system, such as the computer (101) described in FIG. 1, performs each of the steps described in FIG. 4. The system may be implemented as a single computer or a plurality of computers.

The system may receive data from a first database and data from a second database. The first database may be a first source database for being integrated with the second database. The second database may be a second source database for being integrated with the first database.

Each of the first database and the second database may be any database such as a database used for corporate or personal purpose. Each of the first database and the second database may be, for example, but not limited to, a personal name database, a disease name database, an address database, or a corporate name database.

In step 401, the system starts the process for judging data consistency in a database and constructing or updating a data model for an integrated database.

In step 402, the system may take a property generating tool from a property management database.

In step 403, the system investigates data obtained from the first database, using the property generating tool, and, if possible, generates a first property of data obtained from the first database. Further, the system investigates data obtained from the second database, using the property generating tool, and, if possible, generates a second property of data obtained from the first database.

The data obtained from the first database may be a part or all of data stored in the first database. The data obtained from the first database may be obtained by referring to the first database or receiving the data from the first database.

The data obtained from the second database may be a part or all of data stored in the second database. The data obtained from the second database may be obtained by referring to the second database or receiving the data from the second database.

The investigation may be made as the same manner mentioned in step 203 described in FIG. 2A.

The first property of data may be generated as the same manner mentioned in step 203 described in FIG. 2A.

The second property of data may be generated as the same manner mentioned in step 203 described in FIG. 2A.

In step 404, the system judges whether a first property of data and a second property of data are generated. If the judgment is positive, the system proceeds to step 405. Meanwhile, if the judgment is negative, the system proceeds to a final step 409.

In step 405, the system associates the first property with an attribute of a data model to generate a first data property definition. Further, the system associates the second property with an attribute of the data model to generate a second data property definition.

The data model may be the same as that mentioned in step 205 described in FIG. 2A.

The first data property definition has the first property and the attribute of the data model for the database. The second data property definition has the second property and the attribute of the data model for the database.

The system may store the first and second data property definitions into a data property definition database.

In step 406, the system may take a data judging tool from the property tool management database.

In step 407, the system compares the first data property definition with the second data property definition to judge data consistency.

In step 408, the system generates, using a result of the comparison, a new database that includes the data obtained from the first database and the data obtained from the second database. The new database may be an integrated database. Further, the system may construct or update a data model for the new database, using the result of the comparison.

In step 409, the system terminates the process mentioned above.

According to the process described in FIG. 4, the first data property definition is compared with the second data property definition to judge data consistency and, therefore, the data model for the third database can be constructed or updated.

Figure 5:
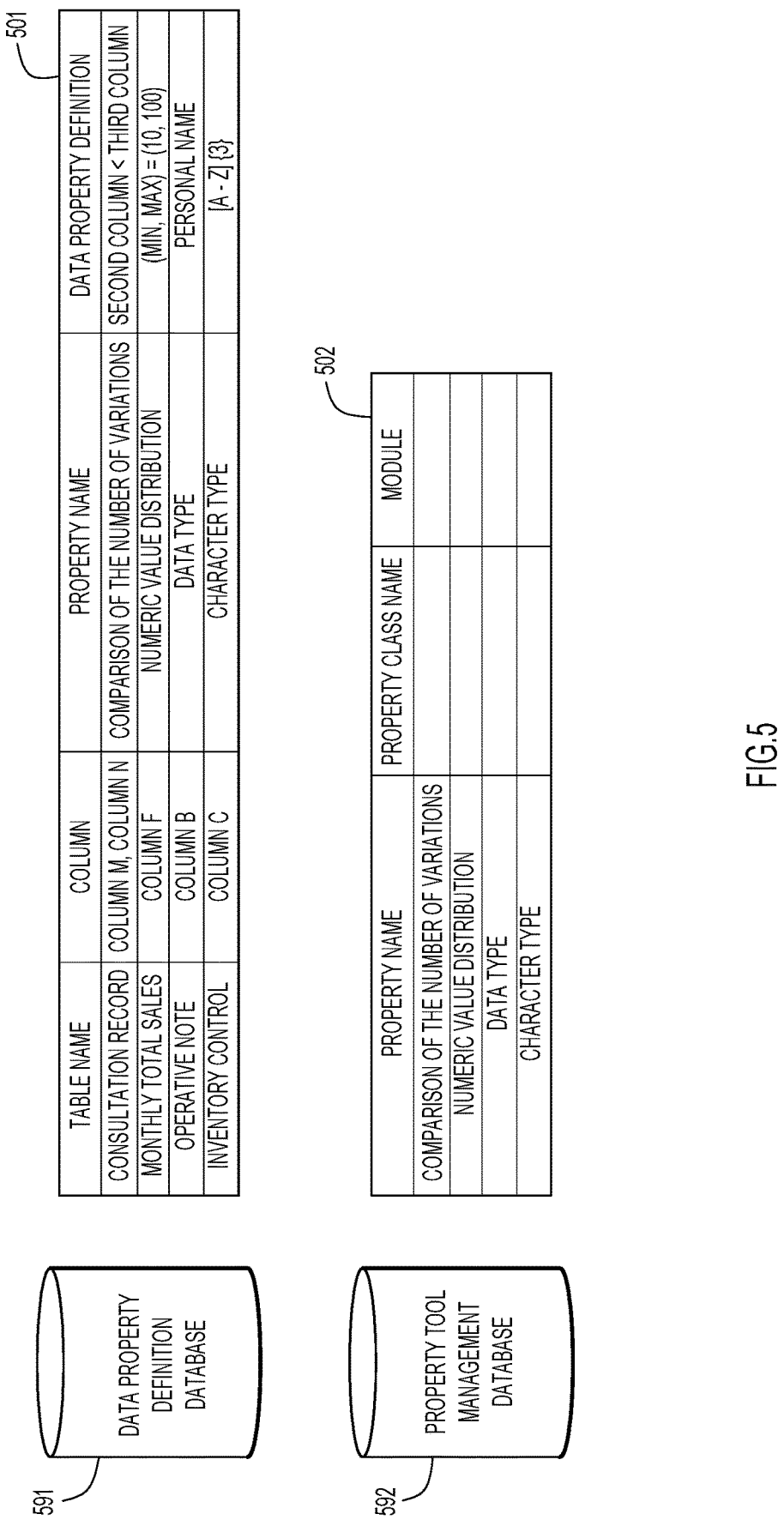
FIG. 5 illustrates example diagrams of a data property definition database and a property tool management database according to one embodiment.

With reference now to FIG. 5, FIG. 5 illustrates one embodiment of a data property definition database and a property tool management database.

Table (501) illustrates an example of data property definitions. Table (501) may be stored in a data property definition database (591).

Table (502) illustrates an example of tools. The tools are a property generating tool and a data judging tool. Table (502) may be stored in a property tool management database (592). Each of the tools is a property generating tool or a data judging tool. Each of the tools is implemented as, for example, but not limited to, a Java® program. For example, the property generating tool may be implemented as a method, detect( ) For example, the data judging tool may be implemented as a method, validate( ).

FIGS. 6A to 6E illustrate example diagrams for judging data consistency in a database according to embodiments.

A system, such as the computer (101) described in FIG. 1, performs each of the steps described in each of the embodiments described in FIGS. 6A to 6E. The system may be implemented as a single computer or a plurality of computers.

The system may receive data from a first database and data from a second database. The first database may be a first source database for being integrated with the second database. The second database may be a second source database for being integrated with the first database. The integrated database may be referred to herein as a third database.

Figure 6A:
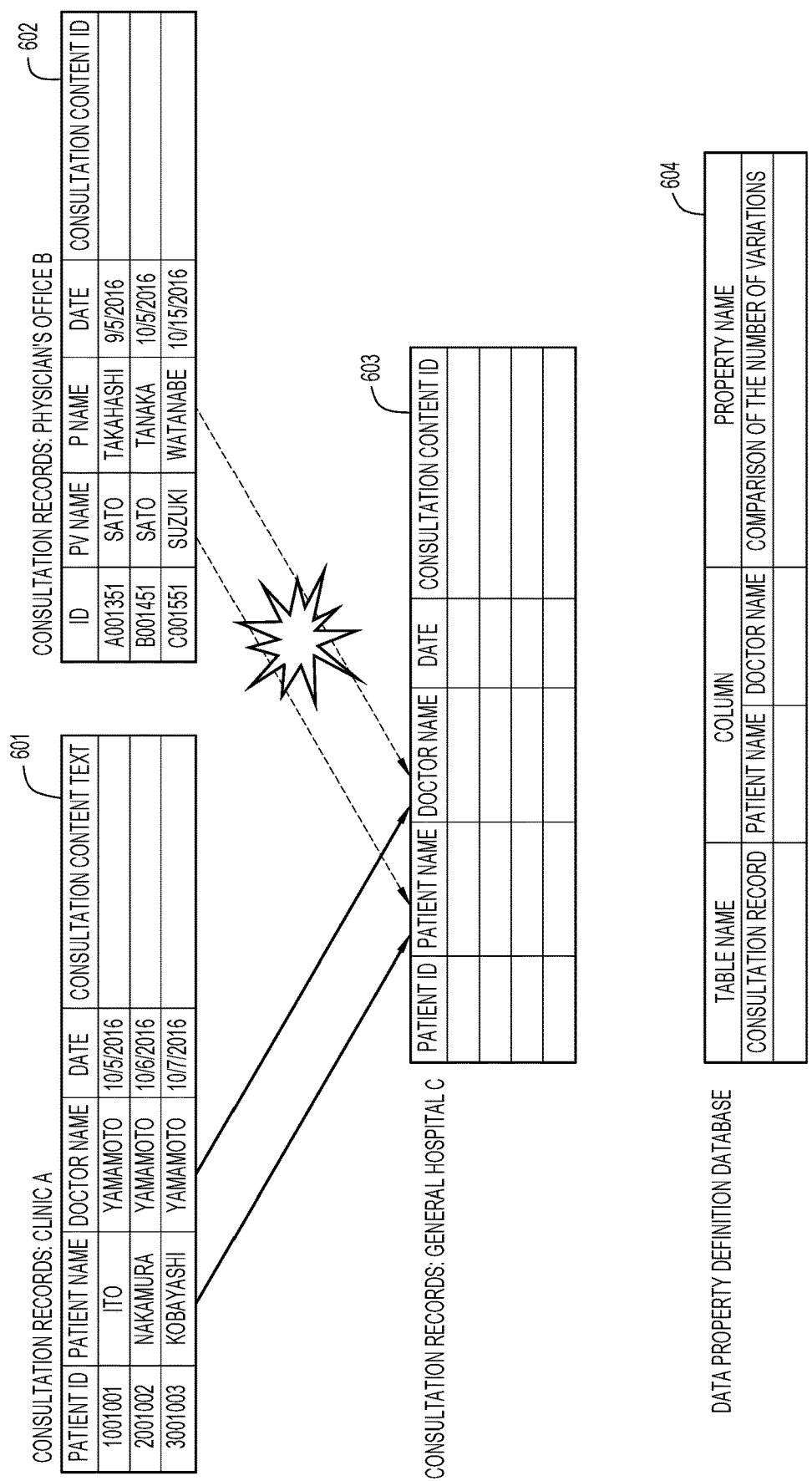
FIGS. 6A to 6E illustrate example diagrams for judging data consistency in a database according to embodiments.

With reference now to FIG. 6A, FIG. 6A illustrates an example of an error of data mapping between a database having consultation records for Clinic A and a database having consultation records for Physician's office B.

The embodiment described in FIG. 6A is for showing that the number of variations is observed and then a data property definition is generated having the property for the number of variations.

A database (601) stores consultation records for Clinic A and corresponds to a first source database. A database (602)

stores consultation records for Physician's office B and corresponds to a second source database. A database (603) is used as an integrated database and used for storing data obtained from the database (601) and data obtained from the database (602). A data model for the database (603) was already made by the user.

A user, such as an administrator of the database (603), makes a plan to integrate data obtained from the database (601) with data obtained from the database (602) to generate the database (603). A mapping between the database (601) and the database (602) is as follows: Column B, "PV name" in the database (602), corresponds to Column B, "Patient Name" in the database (601), and Column C, "P name" in the database (602), corresponds to Column C, "Doctor Name" in the database (601).

First, the system investigates data obtained from the database (601), according to a rule that pairs of columns having common character strings in column names are compared to determine which one has the larger number of variations and then a property of data is generated using a result of the comparison.

The system judges that the number of variations of data can be defined so as to have the following characteristics: Column "Patient Name">Column "Doctor Name". Accordingly, the system generates a property of data obtained from the database (601) as follows: "Patient Name">Column "Doctor Name". Further, the system associates the property with an attribute of a data model of the database (603). The attribute may be a column name where data, "Patient Name" or "Doctor Name", is stored in the database (603).

The system judges whether data obtained from the database (602) satisfies the data property definition. The columns, "PV name" and "P name", for the database (602) do not correspond to Column "Patient Name">Column "Doctor Name", for the database (601). This is because "PV name" and "P name" in the database (602) denote doctor name and patient name, respectively. Therefore, the data obtained from the database (602) does not satisfy the data property definition. Accordingly, the system finds that there is a mapping error in the data model for the database (603).

Finally, the system outputs a negative result which may show a relation of columns, "PV name" and "P name, such as Column "PV name">Column "P name"; or Column, "PV name" corresponding to Column, "Doctor Name">Column, "P name", corresponding to Column, "Patient Name". The output may be executed by displaying the result on a display used for the system.

Accordingly, the user can find the followings: there is an error of data mapping between the database (601) and the database (602); there is a need to update the data property definition; or there is a need to update a data model for the database (603).

The system may continue the judgment during an integration of the data obtained from the database (601), the data obtained from the database (602) or a combination of these; or during a receipt of new data to be handled, such as data from the database (602) or new data which is a subject of storing in the database (603).

Figure 6B:
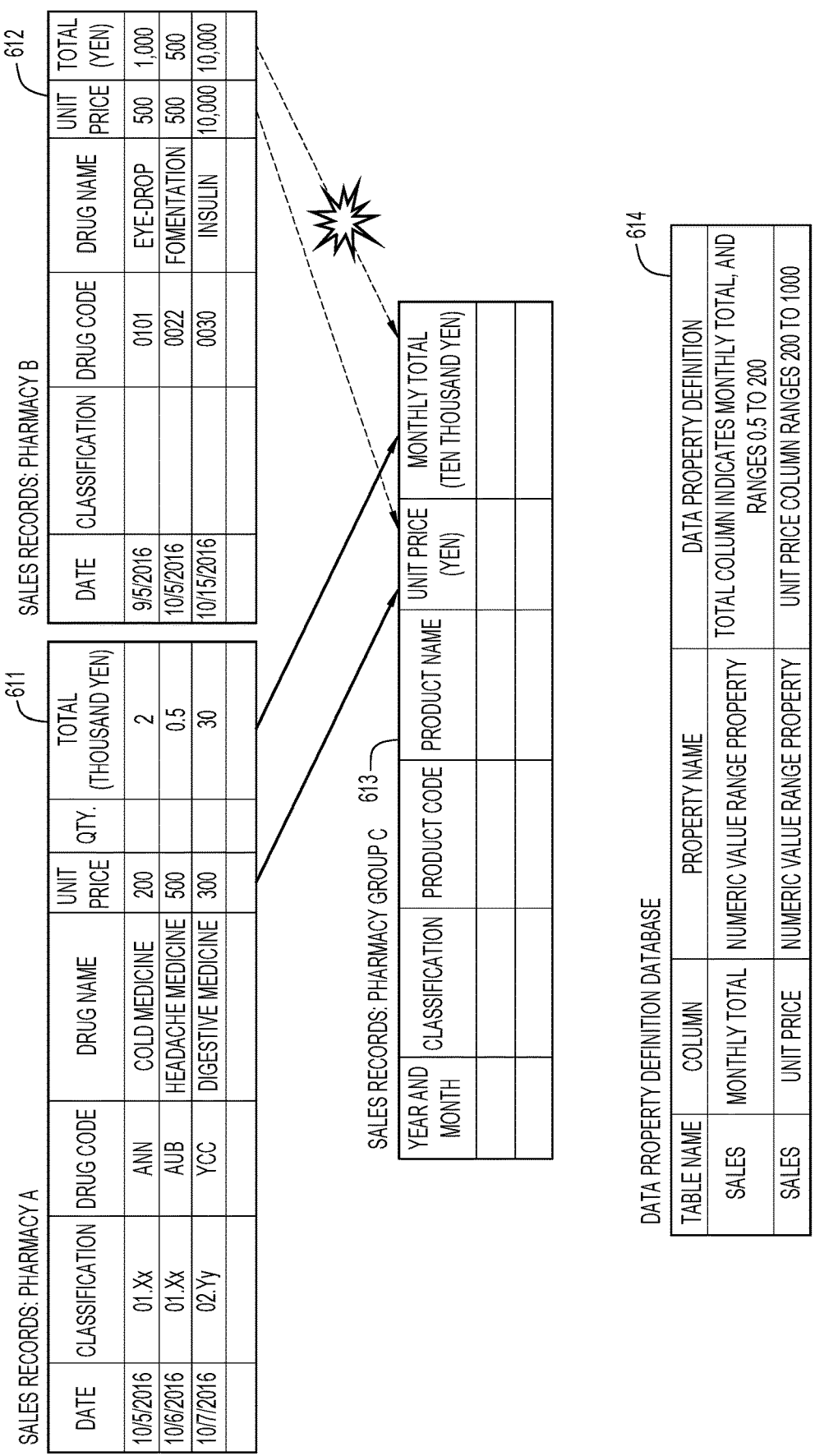

With reference now to FIG. 6B, FIG. 6B illustrates an example of an error of data mapping between a database having sales records for Pharmacy A and a database having sales records for Pharmacy B.

The embodiment described in FIG. 6B is for showing that a numeric value range is observed and then a data property definition is generated having the property for the numeric value range.

A database (611) stores sales records for Pharmacy A and corresponds to a first source database. A database (612) stores sales records for Pharmacy B and corresponds to a second source database. A database (613) is used as an integrated database and used for storing data obtained from the database (611) and data obtained from the database (612). A data model for the database (613) was already made by the user.

A user, such as an administrator of the database (613), makes a plan to integrate data obtained from the database (611) with data obtained from the database (612) to generate the database (613). A mapping between the database (611) and the database (612) is as follows: Column E, "Unit Price" in the database (612), corresponds to Column E, "Unit Price" in the database (611), and Column F, "Total (Yen)" in the database (612), corresponds to Column G, "Total (thousand Yen)" in the database (611). First, the system investigates data obtained from the database (611), according to a rule that the maximum and minimum values in each of columns having an integer type are taken and then a property of data is generated using the numeral ranges.

The system judges that each of the maximum and minimum values in each of integer type column can be defined so as to have the common range. Accordingly, the system generates a property of data obtained from the database (611) as follows: the maximum and minimum values in "Unit Price" are 200 and 1000, respectively; and the maximum and minimum values in "Total" are 0.5 and 200, respectively. Further, the system associates the property with an attribute of a data model of the database (613). The attribute may be a column name where data, "Unit price (Yen)" or "Monthly total (ten thousand Yen)", is stored in the database (613).

The system judges whether data obtained from the database (612) satisfies the data property definition or not. The maximum and minimum values in columns, "Unit price" and "Total (Yen)", for the database (612) do not comply with the maximum and minimum values in columns, "Unit price" and "Total (thousand Yen)", for the database (611), respectively. This is because each of the units in "Unit price" and "Total (Yen)" in the database (612) is different from each of the units in "Unit price" and "Total (thousand Yen)" in the database (611), respectively. Therefore, the data obtained from the database (612) does not satisfy the data property definition. Accordingly, the system finds that there is a mapping error in the data model for the database (613).

Finally, the system outputs a negative result which may show that each of the units in "Unit price" and "Total (Yen)" in the database (612) does not comply with the property of data or each of the units in "Unit price" and "Total (Yen)" in the database (612) is different from each of the units in "Unit price" and "Total (thousand Yen)" in the database (611), respectively. The output may be executed by displaying the result on a display used for the system.

Accordingly, the user can find the following: there is an error of data mapping between the database (611) and the database (612); there is a need to update the data property definition; or there is a need to update a data model for the database (613).

The system may continue the judgment during an integration of the data obtained from the database (611), the data obtained from the database (612) or a combination of these; or during a receipt of new data to be handled, such as data from the database (612) or new data which is a subject of storing in the database (613).

Figure 6C:
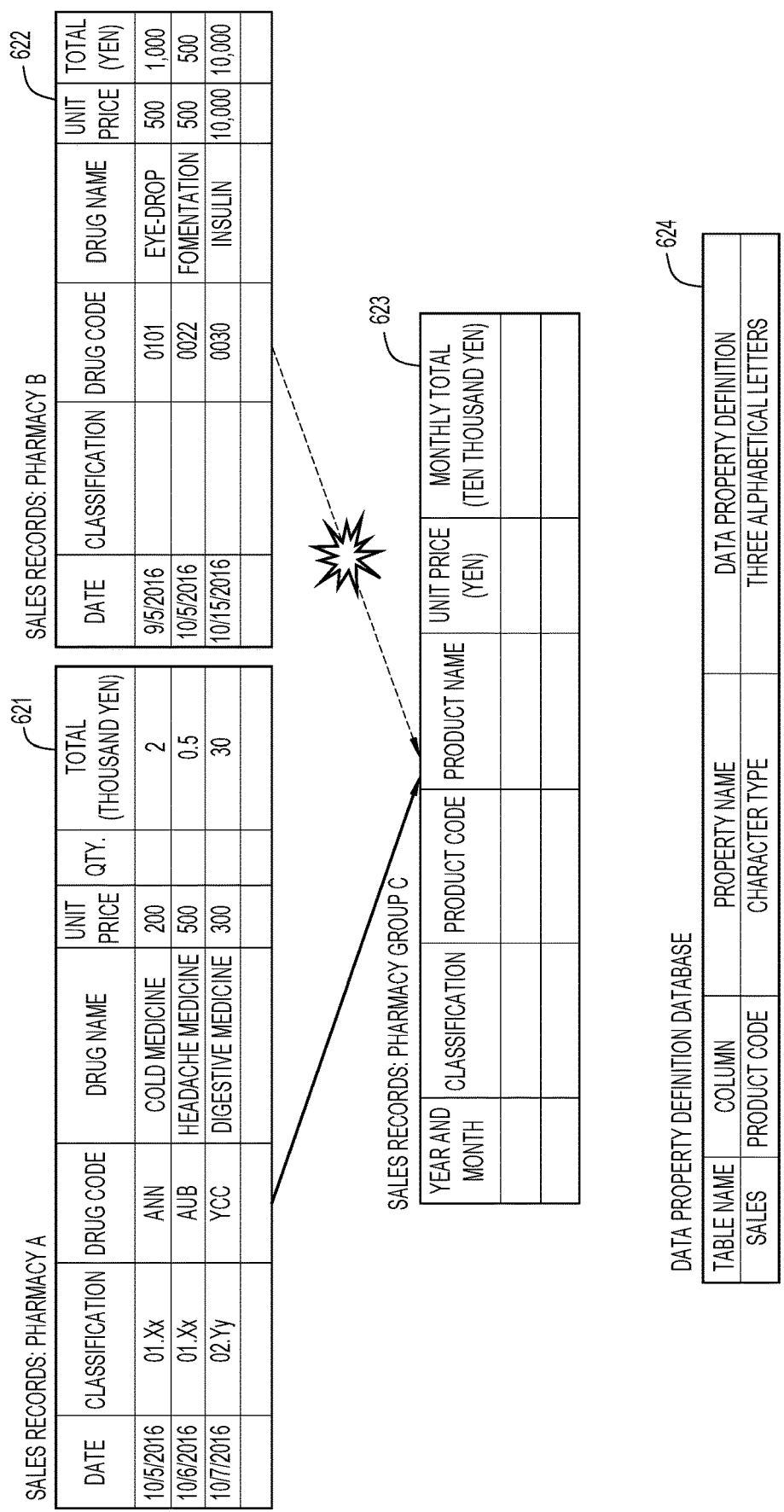

With reference now to FIG. 6C, FIG. 6C illustrates an example of an error of data mapping between a database having sales records for Pharmacy A and a database having sales records for Pharmacy B.

The embodiment described in FIG. 6C is for showing that a character type is observed and then a data property definition is generated having the property for the character type.

A database (621) stores sales records for Pharmacy A and corresponds to a first source database. A database (622) stores sales records for Pharmacy B and corresponds to a second source database. A database (623) is used as an integrated database and used for storing data obtained from the database (621) and data obtained from the database (622). A data model for the database (623) was already made by the user.

A user, such as an administrator of the database (623), makes a plan to integrate data obtained from the database (621) with data obtained from the database (622) to generate the database (623). A mapping between the database (621) and the database (622) is as follows: Column C, "Drug code" in the database (622), corresponds to Column C, "Drug code" in the database (621).

First, the system investigates data obtained from the database (621), according to a rule that columns having a character string type are taken, metadata on each of the columns having a character string type is generated, and then a property of data is generated using the metadata.

The system judges a character string type in columns. Accordingly, the system generates a property of data obtained from the database (621) as follows: the property of data is three alphabetical letters. Further, the system associates the property with an attribute of a data model of the database (623). The attribute may be a column name where data, "Product code" corresponding to "Drug code", is stored in the database (623).

The system judges whether data obtained from the database (622) satisfies the data property definition. The character string type in column "Drug code," for the database (622) does not comply with the character string type in column "Drug code," for the database (621). This is because the character string type, three numeral letters, in column "Drug code," for the database (622) is different from the character string type, three alphabetical letters, in the database (621). Therefore, the data obtained from the database (622) does not satisfy the data property definition. Accordingly, the system finds that there is a mapping error in the data model for the database (623).

Finally, the system outputs a negative result which may show that "Product name" in the database (622) does not comply with the property of data or "Product name" in the database (622) is different from "Drug code" in the database (621). The output may be executed by displaying the result on a display used for the system.

Accordingly, the user can find the following: there is an error of data mapping between the database (621) and the database (622); there is a need to update the data property definition; or there is a need to update a data model for the database (623).

The system may continue the judgment during an integration of the data obtained from the database (621), the data obtained from the database (622) or a combination of these; or during a receipt of new data to be handled, such as data from the database (622) or new data which is a subject of storing in the database (623).

Figure 6D:
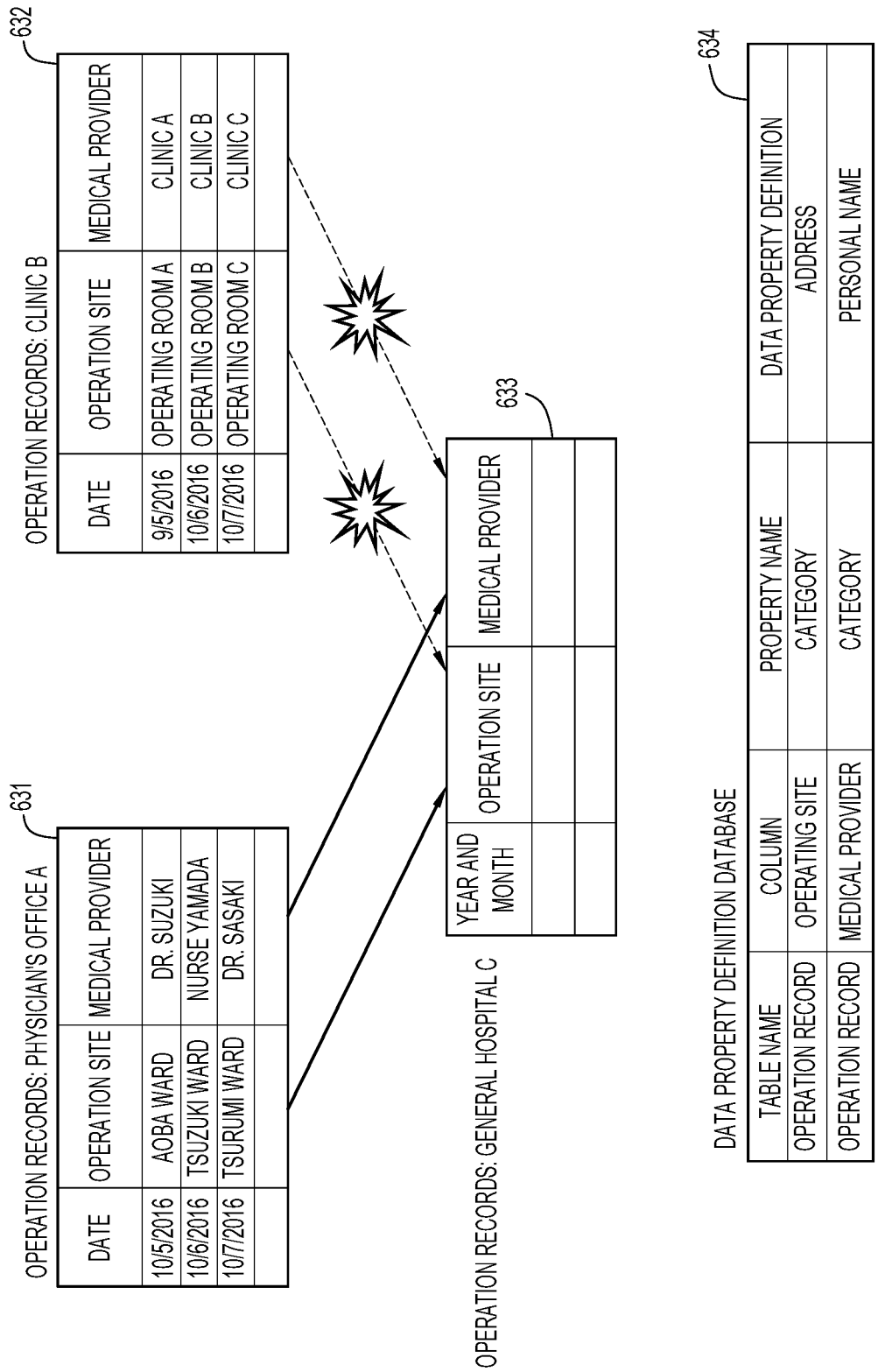

With reference now to FIG. 6D, FIG. 6D illustrates an example of an error of data mapping between a database having operation records for physician's office A and a database having operation records for Clinic B.

The embodiment described in FIG. 6D is for showing that a data category is observed and then a data property definition is generated having the property for the data category.

A database (631) stores operation records for Physician's office A and corresponds to a first source database. A database (632) stores operation records for Clinic B and corresponds to a second source database. A database (633) is used as an integrated database and used for storing data obtained from the database (631) and data obtained from the database (632). A data model for the database (633) was already made by the user.

A user, such as an administrator of the database (633), makes a plan to integrate data obtained from the database (631) with data obtained from the database (632) to generate the database (633). A mapping between the database (631) and the database (632) is as follows: Column B, "Operation site," and Column C, "Medical provider," in the database (632), correspond to Column B, Operation site," and Column C, "Medical provider," in the database (631), respectively.

First, the system investigates data obtained from the database (631), according to a rule that "Operation site" denotes a ward name in Yokohama City in Japan and "Medical provider" denotes a doctor's or nurse's name, and then a property of data is generated by referring to an existing user database or address database.

The system judges a category in columns having the name, Column B, "Operation site", and Column C, "Medical provider". Accordingly, the system generates a property of data obtained from the database (631) as follows: the property of Column B, "Operation site," is an address and the property of Column C, "Medical provider," is personal name. Further, the system associates the property with an attribute of a data model of the database (633). The attribute may be a column name where each of data, "Operation site" and "Medical provider," is stored in the database (633).

The system judges whether data obtained from the database (632) satisfies the data property definition. The category in each of the columns "Operation site" and "Medical provider" for the database (632) does not comply with the columns "Operation site" and "Medical provider" for the database (631). This is because the categories in the columns "Operation site" and "Medical provider" for the database (632) correspond to an operating room in Clinic A, B or C and Clinic name A, B or C, respectively, while the categories in the columns "Operation site" and "Medical provider" for the database (631) correspond to a ward name in Yokohama City in Japan and a doctor's or nurse's name, respectively. Therefore, the data obtained from the database (632) does not satisfy the data property definition. Accordingly, the system finds that there is a mapping error in the data model for the database (633).

Finally, the system outputs a negative result which may show that "Operation site" and "medical provider" in the database (632) do not comply with the property of data, or that "Operation site" and "medical provider" in the database (632) are different from "Operation site" and "medical provider" in the database (631), respectively. The output may be executed by displaying the result on a display used for the system.

Accordingly, the user can find the following: there is an error of data mapping between the database (631) and the database (632); there is a need to update the data property definition; or there is a need to update a data model for the database (633).

The system may continue the judgment during an integration of the data obtained from the database (631), the data obtained from the database (632) or a combination of these; or during a receipt of new data to be handled, such as data from the database (632) or new data which is a subject of storing in the database (633).

Figure 6E:
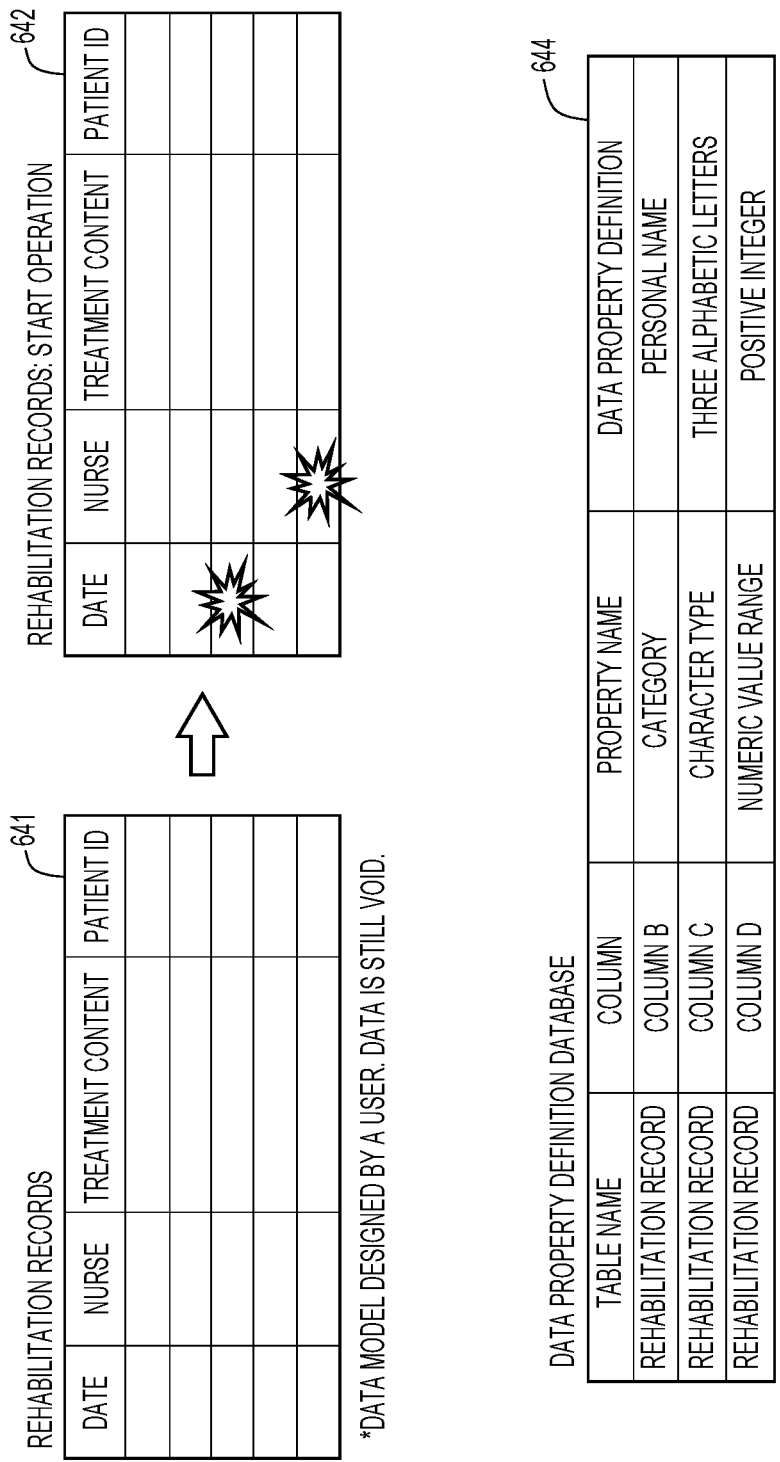

With reference now to FIG. 6E, FIG. 6E illustrates an example of a generation of a new database, using a property of data.

The embodiment described in FIG. 6E is for showing that data situations after start of an operation are viewed on whether a data model comply with an intention of a user and then a data property definition is generated or updated.

A database (641) stores rehabilitation operation records and has no data now as an initial state.

First, a data model for the database (641) may be designed by a user, such as an administrator of the database (633).

Further, properties of data may be also designed by the user. The properties of data may be stored in a data property definition database (644).

The system starts an operation for storing data in the database (641). After starting an operation, the database is updated by storing the data (see table (642)).

The system investigates data stored in the database (641), by referring to a data property definition database (644).

The system judges whether data stored in the database (641) satisfies the data property definition.

For example, the following problem may be detected using the data property definition: in a case involving a value which is different from a personal name; in a case where a patient ID and a nurse ID from the new terminal device are inverted; in a case where the number of entities per person is too large; in a case where all the records belong to one person; or in a case where data is not for a nurse's name, but a doctor's name.

In a case where the judgment is negative, the system outputs a negative result of the judgment. The output may be executed by displaying the result on a display used for the system.

Accordingly, the user can find the following: there is a need to update the data property definition; or there is a need to update a data model for the database (642).

The system may continue the judgment during storing new data to be handled.

Figure 7:
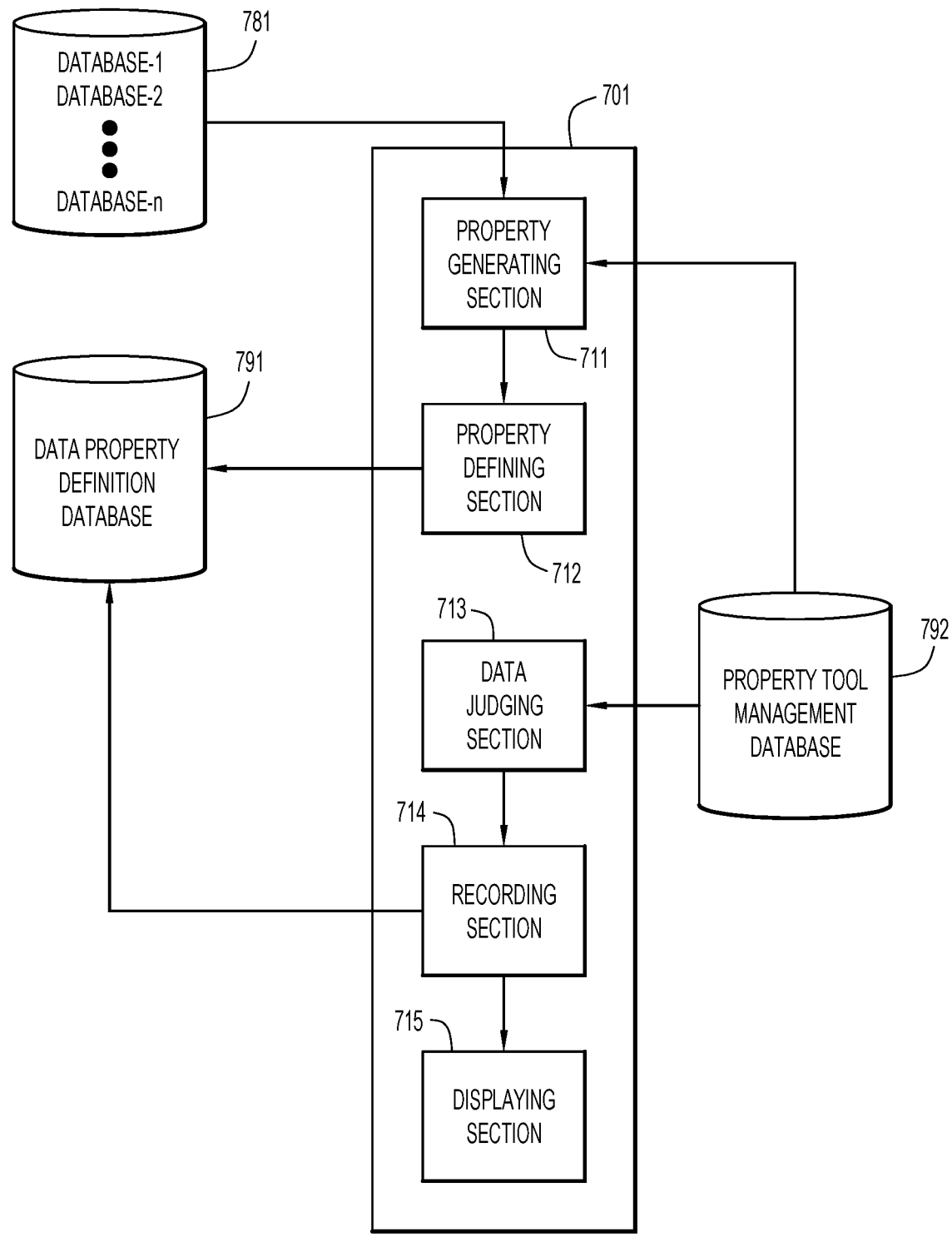
FIG. 7 illustrates an overall functional block diagram of system hardware used in accordance with the flowcharts described in each of FIGS. 2A to 2F, FIGS. 3A and 3B and FIG. 4 according to an embodiment.

FIG. 7 illustrates an embodiment of an overall functional block diagram of system hardware used in accordance with one embodiment to perform the flowcharts described in each of FIGS. 2A to 2F, FIGS. 3A and 3B, and FIG. 4.

The system (701) may correspond to the computer (101) described in FIG. 1.

The system (701) comprises a property generating section (711), a property defining section (712), a data judging section (713), a recording section (714) and a displaying section (715).

The property generating section (711) generates a property of data obtained from a first database (781). The property generating section (711) uses a property generating tool obtained from a property tool management database (792) to generate the property of data.

The property generating section (711) may generate a third property of data in a third database which stores the data obtained from the first database and the data obtained from the second database.

The property generating section (711) may generate a second property of data obtained from the second database.

The property generating section (711) may generate a property of data obtained from a database.

The property generating section (711) may generate a first property of data obtained from a first database and generate a second property of data obtained from a second database.

The property generating section (711) may perform steps 202 and 203 described in FIG. 2A, steps 302 and 303 described in FIG. 3A, and steps 402 and 403 described in FIG. 4.

The property defining section (712) associates the property with an attribute of a data model to generate a data property definition. The property defining section (712) may store the data property definition in a data property definition database (791).

The property defining section (712) may replace the data property definition with a modified data property definition in a case where the data property definition is modified via the user interface. The property defining section (712) may store the modified data property definition in the data property definition database (791).

The property defining section (712) may associate the third property with an attribute of a data model for the third database to generate a third data property definition.

The property defining section (712) may associate the second property with an attribute of the data model to generate a second data property definition.

The property defining section (712) may associate the property with an attribute of a data model to generate a data property definition.

The property defining section (712) may associate the first property with an attribute of a data model to generate a first data property definition and associate the second property with an attribute of the data model to generate a second data property definition.

The property defining section (712) may perform steps 204 and 205 described in FIG. 2A, steps 304 and 305 described in FIG. 3A, and steps 404 and 405 described in FIG. 4.

The data judging section (713) judges whether data obtained from a second database satisfies the data property definition or not. The data judging section (713) uses a data judging tool obtained from the property management database (792) to judge whether data obtained from a second database satisfies the data property definition.

The data judging section (713) may judge whether new data to be handled satisfies the modified data property definition.

The data judging section (713) may judge whether data which is stored in the third database satisfies the third data property definition.

The data judging section (713) may compare the data property definition which was generated from the data obtained from the first database with the second data property definition.

The data judging section (713) may judge whether data which is stored in the database satisfies the data property definition.

The data judging section (713) may compare the first data property definition with the second data property definition to judge data consistency.

The data judging section (713) may perform steps 206 and 207 described in FIG. 2A, steps 306 and 307 described in FIG. 2A, and steps 406 and 407 described in FIG. 4.

The recording section (714) stores a result of the judgment.

The recording section (714) may perform step 208 described in FIG. 2A, and step 308 described in FIG. 3A.

The displaying section (715) displays the result of the judgment. The displaying section (715) may present to a user the result in a case where the result of the judgment is negative. The displaying section (715) may display, on a display, a user interface used for modifying the data property definition.

The displaying section (715) may perform step 208 described in FIG. 2A, and step 308 described in FIG. 3A.

According to an embodiment of the present invention, an accuracy of data mapping can be verified in a semantic aspect, using the data property definition.

According to an embodiment of the present invention, a verification of data mapping can be allowed in a case where an auto mapping is executed.

According to an embodiment of the present invention, an error detection is allowed for data model design and reading-and-writing application design in a case where a new database is constructed.

According to an embodiment of the present invention, errors which have been conventionally difficult to be automatically detected can be detected in a case where there is no technical problem even with an erroneous mapping.

According to an embodiment of the present invention, a data mapping can be estimated and presented using a result of extracting a property of data.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The expression "a/one" should be understood as "at least one".

The expression "comprise(s)/comprising a/one" should be understood as "comprise(s)/comprising at least one".

The expression "comprise(s)/comprising" should be understood as "comprise(s)/comprising at least".

The expression "/" should be understood as "and/or".

What is claimed is:

1. A computer-implemented method for judging data consistency in a database, the method comprising:
    analyzing data obtained from a table of a first database and generating a property of the data obtained from the first database, wherein the property specifies minimum and maximum values defining a value range for the data obtained from the first database;
    associating the property with an attribute of a data model to generate a data property definition;
    applying data obtained from a table of a second database to the data property definition and judging whether the data obtained from the second database satisfies the data property definition; and
    outputting a result of the judgment indicating whether the data obtained from the second database satisfies the data property definition.

2. The method according to claim 1, wherein the result is presented to a user in a case where the result of the judgment whether data obtained from the second database satisfies the data property definition is negative.

3. The method according to claim 2, wherein the presentation of the result is executed by displaying, on a display, a user interface used for modifying the data property definition.

4. The method according to claim 3, the method further comprising, in a case where the data property definition is modified via the user interface, replacing the data property definition with a modified data property definition.

5. The method according to claim 4, the method further comprising:
    judging whether new data to be handled satisfies the modified data property definition; and
    outputting a result of the judgment whether new data to be handled satisfies the modified data property definition.

6. The method according to claim 5, wherein the new data to be handled is new data obtained from the first database, new data obtained from the second database, or new data which is a subject of storing in a database which stores the data obtained from the first database and the data obtained from the second database.

7. The method according to claim 1, wherein in a case where the result of the judgment whether data obtained from the second database satisfies the data property definition is negative, the data model is updated, using the output result, the data model being for a database which stores the data obtained from the first database and the data obtained from the second database.

8. The method according to claim 1, wherein the method further comprises:
    generating a third property of data in a third database which stores the data obtained from the first database and the data obtained from the second database;
    associating the third property with an attribute of a data model for the third database to generate a third data property definition;
    judging whether data which is stored in the third database satisfies the third data property definition; and
    outputting a result of the judgment whether data which is stored in the third database satisfies the third data property definition.

9. The method according to claim 1, wherein the method further comprises:
    generating a second property of data obtained from the second database;
    associating the second property with an attribute of the data model to generate a second data property definition;
    comparing the data property definition which was generated from the data obtained from the first database with the second data property definition; and
    updating, using a result of the comparison, the data model, the data model being for a database which stores the data obtained from the first database and the data obtained from the second database.

10. The method according to claim 1, wherein the property of data further includes a number of data variations in a column or row of data obtained from the first database.

11. The method according to claim 1, wherein the property of data further includes a number of data variations of data in a plurality of columns or rows in the first database.

12. The method according to claim 1, wherein the property of data further includes a property based on data in a plurality of columns or rows in the first database, and wherein a part of the data in the plurality of columns or rows in the first database comprises a column name or row name, respectively.

13. The method according to claim 1, wherein the property of data further includes the number of data variations in each column or row, a property of numerical data in each column or row, a property of character string data in each column or row, and/or a property of data category in each column or row.

14. The method according to claim 1, wherein the data obtained from the second database is integrated with the data obtained from the first database and then a third database is constructed or updated.

15. The method according to claim 1, wherein the data model is for a database which stores the data obtained from the first database.

16. The method according to claim 1, wherein the data model is for an integrated database which stores the data obtained from the first database and the data obtained from the second database.

17. The method according to claim 1, wherein the result is an error of data mapping between the data obtained from the first database and the data obtained from the second database.

18. The method according to claim 17, wherein the mapping error is a semantic mapping error.

19. A computer-implemented method for judging data consistency in a database, the method comprising:
  analyzing data obtained from a database and generating a property of the data obtained from the database, wherein the property specifies minimum and maximum values defining a value range for the data obtained from the database;
  associating the property with an attribute of a data model to generate a data property definition;
  applying data stored in the database to the data property definition and judging whether the data which is stored in the database satisfies the data property definition; and
  outputting a result of the judgment.

20. The method according to claim 19, wherein the result is presented to a user in a case where the result of the judgment is negative.

21. The method according to claim 20, wherein a presentation of the result is executed by displaying, on a display, a user interface used for modifying the data property definition.

22. The method according to claim 21, the method further comprising, in a case where the data property definition is modified via the user interface, replacing the data property definition with a modified data property definition.

23. A computer-implemented method for judging data consistency in a database, the method comprising:
  generating a first property of data obtained from a table of a first database and generating a second property of data obtained from a table of a second database, wherein the property of the data of the first database specifies minimum and maximum values defining a value range for the data obtained from the first database and the property of the data of the second database specifies minimum and maximum values defining a value range for the data obtained from the second database;
  associating the first property with an attribute of a data model to generate a first data property definition and associating the second property with an attribute of the data model to generate a second data property definition; and
  comparing the first data property definition with the second data property definition to judge data consistency;
  wherein a new database in which the data obtained from the first database and the data obtained from the second database is stored is generated using a result of the comparison.

24. A system, comprising:
  a memory storing a program which, when executed on a processor, performs an operation for judging data consistency in a database, the operation comprising:
    analyzing data obtained from a table of a first database and generating a property of the data obtained from the first database, wherein the property specifies minimum and maximum values defining a value range for the data obtained from the first database;
    associating the property with an attribute of a data model to generate a data property definition;
    applying data obtained from a table of a second database to the data property definition and judging whether the data obtained from the second database satisfies the data property definition; and
    outputting a result of the judgment.

25. A computer program product for judging data consistency in a database, the computer program product comprising a computer readable storage medium having program instructions embodied therewith, wherein the computer readable storage medium is not a transitory signal per se, the program instructions executable by a computer to cause the computer to perform a method comprising:
  analyzing data obtained from a table of a first database and generating a property of the data obtained from the first database, wherein the property specifies minimum and maximum values defining a value range for the data obtained from the first database;
  associating the property with an attribute of a data model to generate a data property definition;
  applying data obtained from a table of a second database to the data property definition and judging whether the data obtained from the second database satisfies the data property definition; and
  outputting a result of the judgment.

* * * * *